US012619542B2

(12) United States Patent
Chen et al.

(10) Patent No.: US 12,619,542 B2
(45) Date of Patent: May 5, 2026

(54) METHOD AND APPARATUS FOR MANAGING SHARED CACHE, AND STORAGE MEDIUM

(71) Applicant: HUAWEI TECHNOLOGIES CO., LTD., Shenzhen (CN)

(72) Inventors: Zehui Chen, Novosibirsk (RU); Ruliang Dong, Hangzhou (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 18/818,955

(22) Filed: Aug. 29, 2024

(65) Prior Publication Data

US 2024/0419600 A1 Dec. 19, 2024

Related U.S. Application Data

(63) Continuation of application No. PCT/CN2023/079164, filed on Mar. 2, 2023.

(30) Foreign Application Priority Data

Mar. 2, 2022 (CN) .......................... 202210197738.6
Jul. 29, 2022 (CN) .......................... 202210908210.5

(51) Int. Cl.
*G06F 12/00* (2006.01)
*G06F 12/084* (2016.01)

(52) U.S. Cl.
CPC ...... *G06F 12/084* (2013.01); *G06F 2212/622* (2013.01)

(58) Field of Classification Search
CPC ............. G06F 12/084; G06F 2212/622; G06F 12/0842; G06F 12/0875; G06F 12/0895;
(Continued)

(56) References Cited

U.S. PATENT DOCUMENTS 8,489,816 B1 7/2013 Reiner et al.
2004/0230753 A1 11/2004 Amiri et al.
(Continued)

FOREIGN PATENT DOCUMENTS

CN 1728112 A 2/2006
CN 104077241 A 10/2014
(Continued)

OTHER PUBLICATIONS

L. Ou, X. He, M. J. Kosa and S. L. Scott, "A unified multiple-level cache for high performance storage systems," 13th IEEE International Symposium on Modeling, Analysis, and Simulation of Computer and Telecommunication Systems, Atlanta, GA, USA, 2005 (Year: 2005).*
(Continued)

*Primary Examiner* — Arvind Talukdar
(74) *Attorney, Agent, or Firm* — Fish & Richardson P.C.

(57) ABSTRACT

The present disclosure relates to methods and apparatuses for managing a shared cache. One example method includes determining an access characteristic of accessing the shared cache by IO requests of each of K types that access the shared cache, determining a partition size and an eviction algorithm of the IO requests of each type in the shared cache based on the determined access characteristic and a hit rate of the shared cache, and configuring a cache size of the IO requests of each type in the shared cache as the determined partition size, and configuring an eviction algorithm of the IO requests of each type in the shared cache as the determined eviction algorithm.

20 Claims, 5 Drawing Sheets

(58) Field of Classification Search
CPC ........... G06F 12/126; G06F 2209/5011; G06F 2209/5021; G06F 9/5016; G06F 3/0604; G06F 3/061; G06F 3/0629; G06F 3/0656; G06F 18/24
See application file for complete search history.

(56) References Cited

U.S. PATENT DOCUMENTS

| | | | | |
|---|---|---|---|---|
| 2005/0071599 | A1* | 3/2005 | Modha | G06F 12/12 |
| | | | | 711/170 |
| 2010/0250856 | A1 | 9/2010 | Owen et al. | |
| 2010/0318742 | A1* | 12/2010 | Plondke | G06F 12/121 |
| | | | | 711/123 |
| 2015/0339229 | A1 | 11/2015 | Zhang et al. | |
| 2016/0350222 | A1* | 12/2016 | Podaima | G06F 12/109 |
| 2020/0401529 | A1* | 12/2020 | Zhang | G06F 9/3877 |
| 2021/0182216 | A1* | 6/2021 | Yin | G06F 12/126 |
| 2021/0357328 | A1* | 11/2021 | Abed | G06F 12/0811 |

FOREIGN PATENT DOCUMENTS

| | | |
|---|---|---|
| CN | 104572502 A | 4/2015 |
| WO | 2021066844 A1 | 4/2021 |

OTHER PUBLICATIONS

M. K. Qureshi and Y. N. Patt, "Utility-Based Cache Partitioning: A Low-Overhead, High-Performance, Runtime Mechanism to Partition Shared Caches," 2006 39th Annual IEEE/ACM International Symposium on Microarchitecture (MICRO'06), Orlando, FL, USA, 2006 (Year: 2006).*

International Search Report and Written Opinion in International Appln. No. PCT/CN2023/079164, mailed on May 17, 2023, 15 pages (with English Translation).

Extended European Search Report in European Appln. No. 23762941.5, mailed on Mar. 10, 2025, 8 pages.

\* cited by examiner

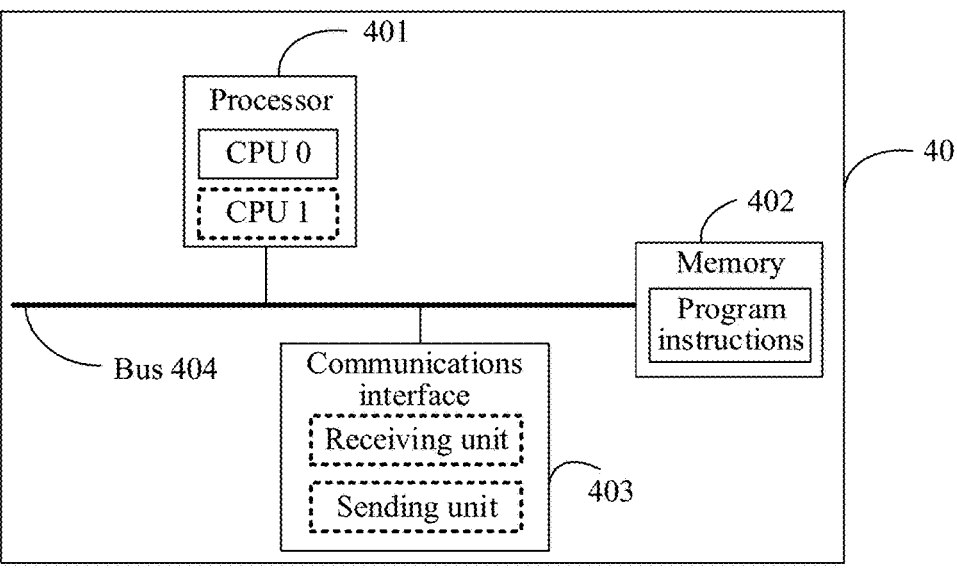

FIG. 4

S101: Obtain IO requests initiated by a plurality of entities, and determine a type of each IO request, where the IO requests initiated by the plurality of entities include IO requests of K types S102: Determine an access characteristic of accessing a shared cache by IO requests of each of the K types, where the access characteristic is respective relationships between hit rates and cache sizes of the IO requests of each of the K types in N eviction algorithms S103: Determine a partition size and an eviction algorithm of the IO requests of each type in the shared cache based on the access characteristic of the IO requests of each of the K types and a hit rate of the shared cache S104: Configure a cache size of the IO requests of each type in the shared cache as the determined partition size of the IO requests of each type in the shared cache, and configure an eviction algorithm of the IO requests of each type in the shared cache as the determined eviction algorithm of the IO requests of each type in the shared cache

FIG. 5

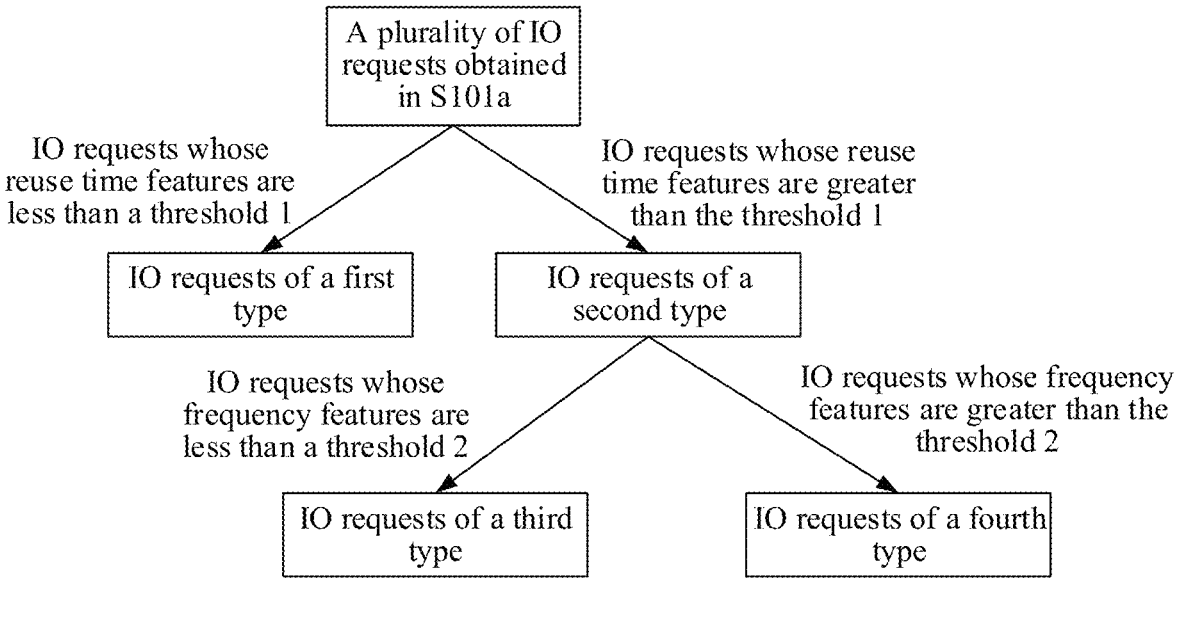

FIG. 8

S201: Obtain IO requests initiated by a plurality of entities, and determine a type of each IO request, where the IO requests initiated by the plurality of entities include IO requests of K types, and IO requests of each of the K types include IO read requests and IO write requests S202: Determine a read access characteristic of accessing a shared cache by IO read requests of each of the K types, and determine a write access characteristic of accessing the shared cache by IO write requests of each of the K types S203: Determine a partition size and an eviction algorithm of the IO requests of each type in the shared cache based on the read access characteristic of the IO read requests of each of the K types, the write access characteristic of the IO write requests of each of the K types, and a hit rate of the shared cache S104: Configure a cache size of the IO requests of each type in the shared cache as the determined partition size of the IO requests of each type in the shared cache, and configure an eviction algorithm of the IO requests of each type in the shared cache as the determined eviction algorithm of the IO requests of each type in the shared cache

FIG. 9

S201: Obtain IO requests initiated by a plurality of entities, and determine a type of each IO request, where the IO requests initiated by the plurality of entities include IO requests of K types, and IO requests of each of the K types include IO read requests and IO write requests S302: Determine, based on the IO read requests of each of the K types, a read hit weight coefficient, the IO write requests of each of the K types, and a write hit weight coefficient, an access characteristic of accessing a shared cache by the IO requests of each of the K types S103: Determine a partition size and an eviction algorithm of the IO requests of each type in the shared cache based on the access characteristic of the IO requests of each of the K types and a hit rate of the shared cache S104: Configure a cache size of the IO requests of each type in the shared cache as the determined partition size of the IO requests of each type in the shared cache, and configure an eviction algorithm of the IO requests of each type in the shared cache as the determined eviction algorithm of the IO requests of each type in the shared cache

FIG. 10

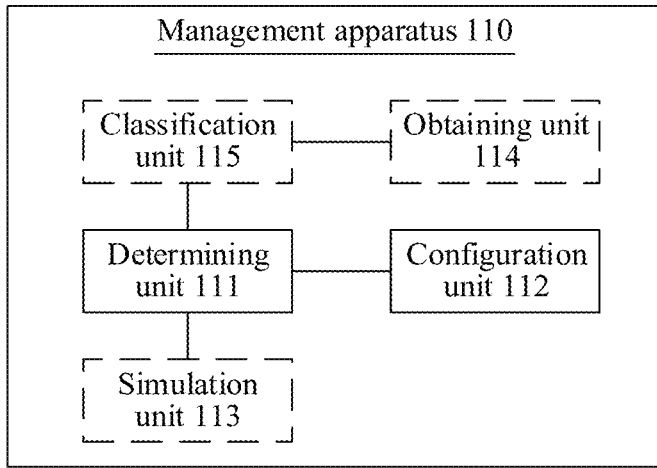

Management apparatus 110

Classification unit 115

Obtaining unit 114

Determining unit 111

Configuration unit 112

Simulation unit 113

FIG. 11

METHOD AND APPARATUS FOR MANAGING SHARED CACHE, AND STORAGE MEDIUM

CROSS-REFERENCE TO RELATED APPLICATIONS

This application is a continuation of International Application No. PCT/CN2023/079164, filed on Mar. 2, 2023, which claims priority to Chinese Patent Application No. 202210908210.5, filed on Jul. 29, 2022, and Chinese Patent Application No. 202210197738.6, filed on Mar. 2, 2022. All of the aforementioned patent applications are hereby incorporated by reference in their entireties.

TECHNICAL FIELD

This application relates to the field of computer technologies, and in particular, to a method and an apparatus for managing a shared cache, and a storage medium.

BACKGROUND

A shared cache is a cache resource shared between a plurality of entities (for example, a plurality of applications, a plurality of clients, or a plurality of processing cores of a computing device) in a cache architecture to adapt to different cache requirements. For example, for a central processing unit (CPU) including a plurality of cores in a computing device, the plurality of cores share a level-3 cache (last level cache, LLC) of the CPU. For another example, in a distributed cache system, data of a single client is dispersedly cached in different cache nodes. Correspondingly, in a scenario in which a plurality of clients exist, the plurality of clients share a cache resource in a single cache node.

When a plurality of entities share a cache, to avoid cache contention, the cache shared by the plurality of entities may be partitioned, so that different partitions are used to cache to-be-cached data of different entities.

However, currently, for cache partition of a shared cache, a partition size is usually manually specified, or a cache partition size is determined according to a simple priority policy. In addition, a same eviction algorithm is used across the entire shared cache, resulting in poor performance of the shared cache.

SUMMARY

This application provides a method and an apparatus for managing a shared memory, and a storage medium, to improve cache performance of the shared cache.

To achieve the objective, this application provides the following technical solutions.

According to a first aspect, this application provides a method for managing a shared cache. The method is used to manage the shared cache. The shared cache is configured to cache data that a plurality of IO requests request to operate, the plurality of IO requests correspond to K types, and the shared cache corresponds to N eviction algorithms. The method includes: determining an access characteristic of accessing the shared cache by IO requests of each of the K types; determining a partition size and an eviction algorithm of the IO requests of each type in the shared cache based on access characteristics of the IO requests of the K types and a hit rate of the shared cache; and configuring a cache size of the IO requests of each type in the shared cache as the determined partition size of the IO requests of each type in the shared cache, and configuring an eviction algorithm of the IO requests of each type in the shared cache as the determined eviction algorithm of the IO requests of each type in the shared cache. The access characteristic of accessing the shared cache by the IO requests of each of the K types is respective relationships between hit rates and cache sizes of the IO requests of each of the K types using the N eviction algorithms.

According to the method for managing a shared cache provided in this application, the access characteristic of the input/output (IO) requests of each type is obtained, and the partition size and the cache eviction algorithm are determined in the shared cache for the IO requests of each type, to help the IO requests of each type obtain proper cache performance, thereby improving cache performance of the entire shared cache. Specifically, in a data read scenario, a hit rate of the shared cache may be improved, thereby improving data read efficiency. In a data write scenario, a write hit rate is improved, thereby reducing a quantity of times that the shared cache performs flushing into a back-end storage unit.

In a possible design manner, the determining an access characteristic of accessing the shared cache by IO requests of each of the K types includes: for a first eviction algorithm in the N eviction algorithms, simulating, in the shared cache, hit rates of applying the first eviction algorithm to caches of different sizes for the IO requests of each of the K types, to obtain relationships between the hit rates and the cache sizes. The first eviction algorithm is any one of the N eviction algorithms.

In another possible design manner, the determining an access characteristic of accessing the shared cache by IO requests of each of the K types includes: for a first eviction algorithm in the N eviction algorithms, determining, based on a reuse distance of each of IO requests of a first type and different cache sizes, hit rates of applying the first eviction algorithm to caches of different sizes for the IO requests of the first type, to obtain relationships between the hit rates and the cache sizes. The first eviction algorithm is any one of the N eviction algorithms, and the IO requests of the first type are IO requests of any one of the K types.

In the foregoing two possible designs, two methods for determining the access characteristic of accessing the shared cache by the IO requests of each of the K types are provided.

In another possible design manner, the determining a partition size and an eviction algorithm of the IO requests of each type in the shared cache based on access characteristics of the IO requests of the K types and a hit rate of the shared cache includes: determining hit rates of the IO requests of the K types in the shared cache in each combination based on X hit rates that correspond to X cache sizes and that are determined based on the IO requests of each type in each eviction algorithm; and determining, as the partition size of the IO requests of each type in the shared cache, a cache size that corresponds to the IO requests of each type when a hit rate of the IO requests of the K types in the shared cache is largest, and determining, as the eviction algorithm of the IO requests of each type in the shared cache, an eviction algorithm that corresponds to the IO requests of each type when the hit rate of the IO requests of the K types in the shared cache is largest. For any type in the IO requests of the K types, the X cache sizes and the N eviction algorithms constitute X*N combinations, each combination includes one cache size and one eviction algorithm, and the X cache sizes are X cache sizes preset for a cache corresponding to the IO requests of each type.

According to this possible design, the partition size and the eviction algorithm that correspond to the IO requests of each type when the hit rate of the IO requests of the K types in the shared cache is largest can be determined. Then, the cache size and the eviction algorithm of the IO requests of each of the K types in the shared cache are configured based on the determined partition size and eviction algorithm, so that the cache size and the eviction algorithm of the IO requests of each of the K types in the shared cache can be optimized by jointly solving two factors that affect cache performance: the eviction algorithm and the cache size. Therefore, an optimized cache size and eviction algorithm of the IO requests of each of the K types in the shared cache can improve overall cache performance of the shared cache.

In another possible design manner, before the determining an access characteristic of accessing the shared cache by IO requests of each of the K types, the method further includes: obtaining the plurality of IO requests; and classifying the IO requests into the K types based on features of addresses of data accessed by the plurality of IO requests or based on type tags carried in the plurality of IO requests.

When the IO requests are classified into the K types based on the features of the addresses of the data accessed by the plurality of IO requests, entities that initiate the IO requests do not need to tag, for the IO requests, type tags used for classification, so that the entities that initiate the IO requests do not generate additional resource overheads. In addition, because the method provided in this application does not intrude into an upper layer (the entities that initiate the IO requests) of the cache, the method provided in this application can be applied to a universal cache system oriented to diversified customers, without ecological support.

In another possible design manner, if the shared cache is an LLC of a CPU in a computing device, the plurality of IO requests are IO requests initiated by a plurality of processing cores in the CPU.

In another possible design manner, if the shared cache is a cache in a cache node, the plurality of IO requests are IO requests initiated by a plurality of computing nodes that access the cache node.

In another possible design manner, if the shared cache is a cache pool including caches in a plurality of nodes, the plurality of IO requests are IO requests initiated by a plurality of computing nodes that access the cache pool.

According to the foregoing three possible designs, the method provided in this application may be applied to a plurality of scenarios.

In another possible design manner, the access characteristic is represented by a hit rate curve (HRC) or a miss rate curve (MRC) of the IO requests.

In another possible design manner, the determining an access characteristic of accessing the shared cache by IO requests of each of the K types includes: cyclically determining an access characteristic of accessing the shared cache by the IO requests of each of the K types; and for an access characteristic that is of accessing the shared cache by the IO requests of each of the K types and that is determined in a first cycle, the determining a partition size and an eviction algorithm of the IO requests of each type in the shared cache based on access characteristics of the IO requests of the K types and a hit rate of the shared cache includes: determining, in the first cycle, a partition size and an eviction algorithm of the IO requests of each type in the shared cache based on access characteristics that are of the IO requests of the K types and that are determined in the first cycle and the hit rate of the shared cache. The first cycle is any cycle for determining the access characteristic of accessing the shared cache by the IO requests of each of the K types.

According to the foregoing possible design, the shared cache may cyclically adjust a cache size and an eviction algorithm of the IO requests of each type in the shared cache based on a cache size and an eviction algorithm that are of the IO requests of each of the K types and that are cyclically determined by a computing device, to improve a hit rate of the IO requests in the shared cache in time domain, thereby improving overall cache performance of the shared cache in time domain.

According to a second aspect, this application provides an apparatus for managing a shared cache. The apparatus for managing a shared cache is configured to perform any method provided in the first aspect. In this application, the apparatus for managing a shared cache may be divided into functional modules based on any method provided in the first aspect. For example, each functional module may be obtained through division based on a corresponding function, or two or more functions may be integrated into one processing module. For example, in this application, the apparatus for managing a shared cache may be divided into a determining unit, a configuration unit, and the like based on functions. For descriptions of possible technical solutions performed by the functional modules obtained through division and beneficial effects, refer to the technical solutions provided in the first aspect or corresponding possible designs of the first aspect. Details are not described herein again.

According to a third aspect, this application provides a computing device. The computing device is configured to manage a shared cache. The computing device includes a memory and one or more processors. The one or more processors are configured to read program instructions stored in the memory, to perform any method provided in any one of the first aspect and the possible design manners of the first aspect.

According to a fourth aspect, this application provides a computer-readable storage medium. The computer-readable storage medium includes program instructions, and when the program instructions are run on a computer or a processor, the computer or the processor is enabled to perform any method provided in any one of the first aspect and the possible implementations of the first aspect.

According to a fifth aspect, this application provides a computer program product. When the computer program product is run on a computing device, any method provided in any one of the first aspect and the possible implementations of the first aspect is performed.

It may be understood that any one of the apparatus, computer storage medium, computer program product, or the like provided above may be applied to the corresponding method provided above. Therefore, for beneficial effects that can be achieved by any one of the apparatus, computer storage medium, computer program product, or the like, refer to the beneficial effects in the corresponding method. Details are not described herein again.

In this application, a name of the apparatus for managing a shared cache does not constitute a limitation on devices or functional modules. In actual implementation, these devices or functional modules may appear with other names. Each device or functional module falls within the scope defined by the claims and their equivalent technologies in this application, provided that a function of the device or functional module is similar to that described in this application.

BRIEF DESCRIPTION OF DRAWINGS

FIG. 4 is a schematic diagram of a hardware structure of a computing device according to an embodiment of this application;

FIG. 5 is a schematic flowchart of a method for managing a shared cache according to an embodiment of this application;

FIG. 8 is a schematic diagram of IO request classification according to an embodiment of this application;

FIG. 9 is a schematic flowchart of another method for managing a shared cache according to an embodiment of this application;

FIG. 10 is a schematic flowchart of still another method for managing a shared cache according to an embodiment of this application; and FIG. 11 is a schematic diagram of a structure of an apparatus 110 for managing a shared cache according to an embodiment of this application.

DESCRIPTION OF EMBODIMENTS

Figure 1:
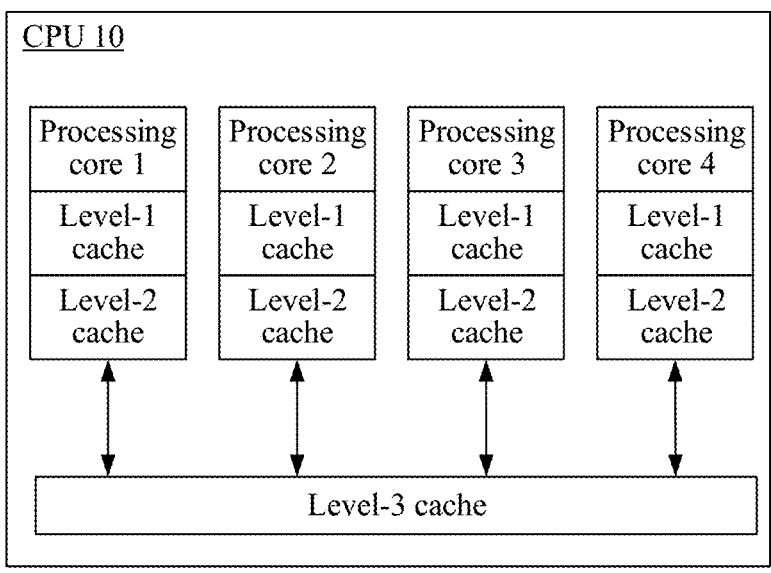
FIG. 1 is a schematic diagram of a scenario of a shared cache.

To better understand embodiments of this application, the following describes some terms or technologies used in embodiments of this application.

1. Cache

When a computing speed of a computing unit does not match an access speed of accessing, by the computing unit, data stored in a storage unit, a large amount of idling is generated because the computing unit waits to access the data in the storage unit. To resolve this problem, a cache technology emerges.

The cache is a memory that can perform high-speed data exchange. Generally, the cache is located between a storage unit (for example, an external storage) and a computing unit (for example, a CPU). The external storage may be, for example, a hard disk of a device. The hard disk may be, for example, a solid state drive (SSD) or a hard disk drive (HDD).

On one hand, high-value data is loaded from the storage unit to the cache in advance, so that the computing unit can directly read, when accessing the high-value data, the high-value data from the cache that can perform high-speed data exchange. In this way, data access efficiency of the computing unit can be improved, thereby reducing an idling time of the computing unit, and improving an execution speed of an application. The high-value data is, for example, data recently accessed by the computing unit, data accessed by the computing unit at a relatively high frequency, or data of a working set, and is not limited thereto. Herein, the working set may be understood as a data set including all data required by an application.

On the other hand, when an entity writes data into the storage unit, the entity may first write to-be-written data into the cache, and then the cache cyclically writes cached data into the external storage (referred to as flushing). The entity is, for example, an application, a computing node, a client device, or a core of a CPU, and is not limited thereto. In this way, for the entity, writing data into the cache may be considered as completing an input/output (IO) operation used to write the data, so that a response speed of the entity can be improved.

Optionally, a cache of a device may be generally implemented by a memory of a node and/or an SSD of the node. The memory is also referred to as a main memory, and is a storage space in which a CPU can directly perform addressing. As an example, the memory may be a dynamic random access memory (DRAM), and is not limited thereto.

(2) Shared Cache

To meet different cache requirements, a cache resource shared by a plurality of entities in a cache architecture is referred to as a shared cache. The plurality of entities may be, for example, a plurality of applications, a plurality of computing nodes, a plurality of client devices, or a plurality of processing cores in a CPU of a computing device, and are not limited thereto. The application is an application running in a computing device. The computing node is a computing node that needs to access a shared cache. The client device may be, for example, a client device of a storage system or a client device of an application. The computing device may be, for example, any device including a CPU, such as a general-purpose computer, a notebook computer, a tablet computer, or a server. This is not limited herein.

The shared cache may be a level-3 cache of a CPU including a plurality of processing cores in a computing device. In this case, a plurality of entities that initiate IO requests to the shared cache are the plurality of processing cores in the CPU.

As an example, FIG. 1 is a schematic diagram of a scenario of a shared cache. As shown in FIG. 1, a CPU 10 of a computing device includes four processing cores: a processing core 1, a processing core 2, a processing core 3, and a processing core 4. An independent level-1 cache and level-2 cache are configured for each of the four processing cores in the CPU 10, and all the four processing cores in the CPU 10 can access a level-3 cache of the CPU 10, in other words, the level-3 cache of the CPU 10 is a shared cache of the four processing cores.

The shared cache may be alternatively a cache in a cache node in a cache system. In this case, a plurality of entities that initiate IO requests to the shared cache are a plurality of client devices that access the cache node, or a plurality of computing nodes that access the shared cache. A specific form of the client device may be any computing node having a computing processing function. This is not limited herein.

The cache system may be a distributed cache system. It may be understood that, in the distributed cache system, data of one computing node may be cached in caches of a plurality of cache nodes in the distributed cache system. Correspondingly, a cache of one cache node in the distributed cache system may cache data of a plurality of computing nodes. Therefore, a cache that is of a cache node in the distributed cache system and that is configured to cache data of a plurality of computing nodes is a shared cache of the plurality of computing nodes.

The cache system may be alternatively a centralized cache system. Generally, the centralized cache system includes one cache node. In this case, data of a plurality of computing nodes is cached in a cache of the cache node. Therefore, the cache of the cache node in the centralized cache system is a shared cache of the plurality of computing nodes.

It should be understood that the cache node may be an independent device. In this case, a cache of the independent device is used as the cache of the cache node. Alternatively, a function implemented by the cache node is implemented by a functional module in the independent device. In other words, the independent device may implement other functions in addition to the function of the cache node. In this case, a part of the cache of the independent device is used as the cache of the cache node. As an example, a function implemented by the cache node in the distributed cache system is integrated into a computing device used as a storage node in the distributed storage system. In other words, the computing device implements the function of the cache node in addition to a function of the storage node. In this case, a part of the cache of the independent device is used as the cache of the cache node.

Figure 2:
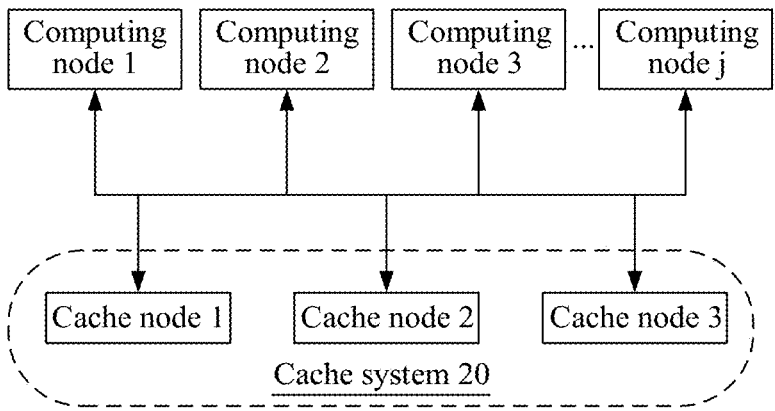
FIG. 2 is a schematic diagram of another scenario of a shared cache.

As an example, FIG. 2 is a schematic diagram of another scenario of a shared cache. FIG. 2 shows j computing nodes that access a distributed cache system 20: a computing node 1, a computing node 2, a computing node 3, . . . , and a computing node j, where j is a positive integer. In addition, the cache system 20 includes three cache nodes: a cache node 1, a cache node 2, and a cache node 3. High-value data of any one of the j computing nodes is dispersedly cached in caches of a plurality of cache nodes in the cache system 20. Correspondingly, a cache of a single cache node in the cache system 20 is a shared cache of the j computing nodes.

The shared cache may be alternatively a cache pool including caches of a plurality of nodes. The cache pool is a cache pool including the caches of all of the plurality of nodes. In this case, a plurality of entities that initiate IO requests to the shared cache are a plurality of computing nodes that access the cache pool. In other words, the cache pool is configured to cache data of the plurality of computing nodes.

The nodes that provide the caches for the cache pool may be nodes in any network system. This is not limited herein. For example, if the nodes that provide the caches for the cache pool are storage nodes in a storage system, the plurality of computing nodes that access the cache pool are a plurality of client devices in the storage system. For another example, if the nodes that provide the caches for the cache pool are a plurality of servers in a server cluster, the plurality of computing nodes that access the cache pool are a plurality of client devices of the server cluster, or a plurality of applications that access the server cluster and that run on the plurality of computing nodes that access the cache pool. This is not limited herein.

Figure 3:
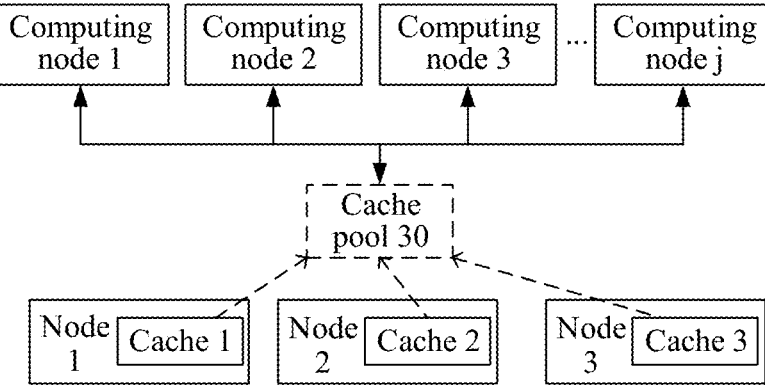
FIG. 3 is a schematic diagram of still another scenario of a shared cache.

As an example, FIG. 3 is a schematic diagram of still another scenario of a shared cache. As shown in FIG. 3, a node 1, a node 2, and a node 3 are storage nodes in a storage system, a cache of the node 1 is a cache 1, a cache of the node 2 is a cache 2, and a cache of the node 3 is a cache 3. In this case, a part of the cache 1, a part of the cache 2, and a part of the cache 3 may constitute a cache pool 30. Then, data of a computing node 1, a computing node 2, a computing node 3, . . . , and a computing node j in the storage system may be cached in the cache pool 30. The cache pool 30 is a shared cache of the j computing nodes.

(3) Read Hit and Write Hit

Because a size of a cache is generally limited and is far less than a size of an external storage, data that can be stored in the cache is very limited.

In a data read scenario, an IO request that is initiated by an entity and that is used to read data carries a logical address of to-be-read data. In other words, the logical address carried in the IO request used to read data is a logical address to be accessed by the IO request.

When data corresponding to the logical address carried in the IO request exists in a cache, the IO request meets a read hit in the cache.

When the data corresponding to the logical address carried in the IO request does not exist in the cache, it indicates that the IO request used to read data does not hit the to-be-read data in the cache, in other words, a cache miss occurs. Then, the cache miss may trigger reading, from a back end (for example, an external storage) of the cache, the to-be-read data that the IO request requests to read, and caching, in the cache, the to-be-read data read from the back end.

It may be learned that when the IO request meets a read hit in the cache, the to-be-read data does not need to be read from the back end, so that a response speed of the entity can be improved.

In a data write scenario, an IO request that is initiated by an entity and that is used to write data carries to-be-written data and a logical address used to store the to-be-written data. In other words, the logical address carried in the IO request used to write data is a logical address to be accessed by the IO request.

When a physical address corresponding to the logical address carried in the IO request exists in a cache, it indicates that data has been written into the logical address before the current IO request, and the data is cached in the cache, but has not been flushed from the cache into an external storage. In this case, this is referred to as hitting, in the cache by the IO request used to write data, the logical address for storing the to-be-written data. This is referred to as a write hit of the IO request in the cache for short. Then, the cache may update, based on the to-be-written data carried in the current IO request, the data that has been written into the logical address in the cache, and subsequently flush the updated data into the external storage.

When the physical address corresponding to the logical address carried in the IO request does not exist in the cache, it indicates that no data has been written into the logical address before the current IO request, or data has written into the logical address before the current IO request and the written data has been flushed by the cache into the external storage. In this case, this is referred to as missing, in the cache by the IO request used to write data, the logical address for storing the to-be-written data. This is referred to as a write miss of the IO request in the cache for short. Then, the cache allocates a corresponding physical address for the logical address carried in the currently received IO request, and writes the to-be-written data carried in the currently received IO request into the physical address, to cache the to-be-written data.

It may be learned that, when an IO request meets a write hit in a cache, data that has been written into a logical address can be updated in the cache, so that a quantity of times that the cache flushes data into an external storage can be reduced, thereby saving a bandwidth between the cache and the external storage.

(4) Eviction Algorithm

In a data read scenario, when an IO request does not hit to-be-read data in a cache, the data needs to be read from a back end (for example, an external storage) of the cache to the cache. For example, for a level-3 cache in a CPU, when a cache miss occurs in the level-3 cache in the CPU, data needs to be read from a memory of a computing device in which the CPU is located to the level-3 cache in the CPU.

For another example, for a memory, when a cache miss occurs in the memory, data needs to be read from an external storage of a device in which the memory is located to the memory.

If a free space in the cache is insufficient to store the data read from the back end, eviction needs to be performed on existing data in the cache (for example, some data or all data is deleted, or some data or all data is tagged as invalid), to provide a storage space for the data newly read from the back end. An algorithm used to determine data that needs to be evicted in the existing data in the cache is the eviction algorithm.

Generally, the eviction algorithm is designed based on an access rule (for example, a data access frequency) used when an IO request accesses data. Therefore, the eviction algorithm is applied to the cache, so that high-value data can be retained in the cache as long as possible, and low-value data can be evicted. In this way, a read hit rate, of an IO request used to read data, in the cache can be improved, thereby improving cache performance.

In a data write scenario, data cached in a cache is cyclically flushed into an external storage, or when an amount of data cached in the cache exceeds a specific amount, currently cached data is flushed into the external storage. In this case, some data whose subsequent update frequency may be relatively low may be flushed into the external storage, and data whose subsequent update frequency may be relatively high may be retained in the cache. In this way, a write hit rate of a subsequent IO request in the cache can be improved, thereby reducing a quantity of times that the cache flushes data into the external storage. Herein, an algorithm used when it is determined, in the cache, data needs to be flushed into the external storage is the eviction algorithm.

(5) Cache Performance

The cache performance may be generally evaluated by a hit rate or a miss rate.

In a scenario in which a read cache and a write cache are separated (the read cache and the write cache are isolated from each other in a physical or software manner), a read hit rate is a ratio of a quantity of read hit times of IO requests in a cache in a period of time to a total quantity of IO read requests in the period of time. A miss rate in a data read scenario is a ratio of a quantity of cache miss times of IO requests in a cache in a period of time to a total quantity of IO read requests in the period of time. A write hit rate is a ratio of a quantity of write hit times of IO requests in a cache in a period of time to a total quantity of IO write requests in the period of time. A miss rate in a data write scenario is a ratio of a quantity of write miss times of IO requests in a cache in a period of time to a total quantity of IO write requests in the period of time.

In a scenario in which a read cache and a write cache are fused (a cache space is shared for data reading and data writing), a hit rate is a ratio of a sum of a quantity of read hit times of IO requests in a cache in a period of time and a quantity of write hit times of the IO requests in the cache in the period of time to a total quantity of IO requests in the period of time. A miss rate is a ratio of a sum of a quantity of cache miss times of IO requests in a cache in a period of time and a quantity of write miss times of the IO requests in the cache in the period of time to a total quantity of IO requests in the period of time.

It may be understood that, the cache performance is related to a size of a cache in addition to an eviction algorithm applied to the cache. Therefore, in practice, the cache performance is generally represented by a miss rate curve (MRC) of the cache or a hit rate curve (HRC) of the cache. The MRC is a curve of a correspondence between a cache size and a miss rate, and is used to describe miss rates of IO requests in caches of different sizes in one eviction algorithm. The HRC is a curve of a correspondence between a cache size and a hit rate, and is used to describe hit rates of IO requests in caches of different sizes in one eviction algorithm.

(6) Reuse Distance

For an IO request initiated by an entity, a reuse distance of the IO request is used to indicate a quantity of different logical addresses accessed by other IO requests during an interval between two consecutive times of accessing a logical address carried in the IO request.

The reuse distance of the IO request may be represented by the quantity of different logical addresses. Specifically, for any one (for example, a first IO request) of a plurality of IO requests initiated by entities in a period of time, a reuse distance of the first IO request is a quantity of different logical addresses accessed by IO requests located between the first IO request and another IO request in a time sequence in the plurality of IO requests initiated by the entities. The another IO request is an IO request that previously accesses, in the time sequence, a logical address carried in the first IO request.

As an example, it is assumed that IO requests initiated by entities in a period of time include 10 IO requests, and logical addresses accessed by the 10 IO requests in a time sequence are respectively (a, b, c, d, a, d, a, c, b, a). Each letter represents one logical address.

In this case, for the first IO request in the 10 IO requests, a logical address carried in the IO request is a. There is no IO request accessing the logical address a before the first IO request in the 10 IO requests. Therefore, a reuse distance of the first IO request is usually infinite (a symbol is ∞) by default. Similarly, for the second IO request, the third IO request, and the fourth IO request in the 10 IO requests, reuse distances of the second IO request, the third IO request, and the fourth IO request are all infinite.

For the fifth IO request in the 10 IO requests, a logical address carried in the IO request is a. There is an IO request accessing the logical address a before the fifth IO request in the 10 IO requests, and a previous IO request accessing the logical address a is the first IO request in the 10 IO requests. In addition, a quantity of different logical addresses accessed by IO requests located between the fifth IO request and the first IO request in the time sequence is 3 (a logical address b accessed by the second IO request, a logical address c accessed by the third IO request, and a logical address d accessed by the fourth IO request are included). Therefore, a reuse distance of the fifth IO request is 3. Similarly, for the sixth IO request in the 10 IO requests, a reuse distance of the sixth IO request is 1. In addition, for the seventh IO request in the 10 IO requests, a reuse distance of the seventh IO request is 1.

For the eighth IO request in the 10 IO requests, a logical address carried in the IO request is c. There is an IO request accessing the logical address c before the eighth IO request in the 10 IO requests, and a previous IO request accessing the logical address c is the third IO request in the 10 IO requests. In addition, a quantity of different logical addresses accessed by IO requests located between the eighth IO request and the third IO request in the time sequence is 2 (the logical address d accessed by the fourth IO request and the sixth IO request, and the logical address a accessed by the fifth IO request and the seventh IO request are included). Therefore, a reuse distance of the eighth IO request is 2.

Similarly, for the ninth IO request in the 10 IO requests, a reuse distance of the ninth IO request is 3. In addition, for the tenth IO request in the 10 IO requests, an access reuse distance of the tenth IO request is 2.

(7) Reuse Time

The reuse time is used to indicate a time interval between two consecutive times of accessing a same logical address. Therefore, the reuse time may be referred to as a reuse time of a logical address.

Usually, the reuse time of the logical address may be represented by a quantity of IO requests. Specifically, for any one (for example, a first IO request) of a plurality of IO requests initiated by entities in a period of time, a reuse time of a logical address carried in the first IO request is a quantity of IO requests located between the first IO request and another IO request in a time sequence in the plurality of IO requests initiated by the entities. The another IO request is an IO request that previously accesses, in the time sequence, a logical address carried in the first IO request.

As an example, it is assumed that IO requests initiated by entities in a period of time include 10 IO requests, and logical addresses accessed by the 10 IO requests in a time sequence are (a, b, d, c, b, d, a, a, c, d). Each letter represents one logical address.

In this case, for the first IO request in the 10 IO requests, a logical address accessed by the IO request is a. There is no IO request accessing the logical address a before the first IO request in the 10 IO requests. Therefore, a reuse time of the logical address a accessed by the first IO request is usually infinite by default. Similarly, for the second IO request, the third IO request, and the fourth IO request in the 10 IO requests, reuse times of a logical address b accessed by the second IO request, a logical address d accessed by the third IO request, and a logical address c accessed by the fourth IO request are all infinite.

For the fifth IO request in the 10 IO requests, a logical address accessed by the IO request is b. There is an IO request accessing the logical address b before the fifth IO request in the 10 IO requests, and a previous IO request accessing the logical address b is the second IO request in the 10 IO requests. In addition, there are two IO requests (including the third IO request and the fourth IO request) between the fifth IO request and the second IO request in the time sequence. Therefore, a reuse time of the logical address b accessed by the fifth IO request is 2. Similarly, for the sixth IO request in the 10 requests, a reuse time of the logical address d accessed by the sixth IO request is 2. For the seventh IO request in the 10 requests, a reuse time of the logical address a accessed by the seventh IO request is 5. For the eighth IO request in the 10 requests, a reuse time of the logical address a accessed by the eighth IO request is 0. For the ninth IO request in the 10 requests, a reuse time of the logical address c accessed by the ninth IO request is 4. For the tenth IO request in the 10 requests, a reuse time of the logical address d accessed by the tenth IO request is 3.

(8) Other Terms

In embodiments of this application, the terms "first" and "second" do not represent a sequence relationship, but are intended to distinguish between different objects. The terms "first", "second", and the like mentioned in the following document are also intended to distinguish between different packets or the like, and cannot be understood as indicating or implying relative importance or implicitly indicating a quantity of indicated technical features.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

To avoid cache contention, a shared cache may be usually partitioned, so that data that IO requests of different types request to read is cached in different partitions of the cache. The IO requests of the different types are, for example, IO requests initiated by different entities. This is not limited herein. However, currently, when the shared cache is divided into cache partitions, usually, a partition size is manually specified based on an access rule (for example, a data access frequency) used when IO requests access data in a period of time, or a cache partition size is determined by using a simple heuristic policy (for example, priorities of IO requests of different types). However, the cache partitions obtained through such division generally can ensure cache performance only in a period of time, and cannot ensure long-term cache performance. In addition, a same eviction algorithm is used in the entire shared cache, resulting in poor performance of the shared cache.

Based on this, embodiments of this application provide a method for managing a shared cache. In the method, first, an access characteristic of accessing the shared cache by IO requests of each of a plurality of types is determined, and a partition size and an eviction algorithm of the IO requests of each type in the shared cache are determined based on the determined access characteristic of the IO requests of each of the plurality of types and a hit rate of the shared cache. Then, the determined partition size and eviction algorithm of the IO requests of each type in the shared cache are applied to the shared cache. The access characteristic of the IO requests of each type is respective relationships between hit rates and cache sizes of the IO requests of each of the plurality of types in a plurality of eviction algorithms. According to the method, a cache size and an eviction algorithm may be set for the IO requests of each type based on the access characteristic of the IO requests of each type, thereby improving performance of the shared cache.

In addition, when the method is cyclically performed, a partition size and an eviction algorithm of the IO requests of each type in the shared cache can be cyclically adjusted in time based on a cyclically determined access characteristic of accessing the shared cache by the IO requests of each of the plurality of types, so that cache performance of the shared cache can be continuously ensured in a time dimension.

The embodiments of this application further provide an apparatus for managing a shared cache. The management apparatus is applied to a computing device, and the computing device can manage the shared cache by performing the method provided in embodiments of this application. For detailed descriptions of the shared cache, refer to the descriptions in the foregoing terms. Details are not described again. As an example, the computing device may be any computing device such as a general-purpose computer, a notebook computer, a tablet computer, a mobile phone, or a vehicle terminal.

Optionally, the computing device may be any computing device including a shared cache. For example, the computing device is a computing device having the CPU shown in FIG. 1. For another example, the computing device may be a server or a cache node (for example, the cache node shown in FIG. 2) including a shared cache. For still another example, the computing device may be any node that includes a shared cache and that is shown in FIG. 3. This is not limited thereto. It may be understood that, when the computing device may be any node that includes the shared cache and that is shown in FIG. 3, the node may interact with another node that includes the shared cache and that is in FIG. 3, to obtain data (for example, an IO request) required for performing the method provided in embodiments of this application, and perform, based on the obtained data, the method described below in embodiments of this application.

Optionally, the computing device may be a computing device that is connected to and communicates with a node including a shared cache. As an example, when the node including the shared cache is a node that provides a cache for the cache pool and that is shown in FIG. 3, the computing device may be an independent node independent of the node that provides the cache for the cache pool, for example, a management node. This is not limited herein. In this case, the computing device may interact with the node that provides the cache for the cache pool, to obtain data (for example, an IO request) required for performing the method provided in embodiments of this application, and perform, based on the obtained data, the method described below in embodiments of this application.

FIG. 4 is a schematic diagram of a hardware structure of a computing device according to an embodiment of this application. As shown in FIG. 4, a computing device 40 includes a processor 401, a memory 402, a communications interface 403, and a bus 404. The processor 401, the memory 402, and the communications interface 403 are connected to each other by using the bus 404.

The processor 401 is a control center of the computing device 40, and may be a general-purpose CPU. Alternatively, the processor 401 may be another general-purpose processor, a digital signal processor (DSP), an application-specific integrated circuit (ASIC), a field-programmable gate array (FPGA), another programmable logic device, a discrete gate or transistor logic device, a discrete hardware component, a graphics processing unit (GPU), a neural processing unit (NPU), a tensor processing unit (TPU), an artificial intelligence chip, a data processing unit (DPU), or the like.

As an example, the processor 401 includes one or more CPUs, for example, a CPU 0 and a CPU 1 shown in FIG. 4. In addition, a quantity of processor cores in each processor is not limited in this application.

The memory 402 is configured to store program instructions or data to be accessed by an application process. The processor 401 may execute the program instructions in the memory 402, to implement the method for managing a shared cache provided in embodiments of this application.

The memory 402 includes a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitation, many forms of RAMs are available, for example, a static random access memory (SRAM), a DRAM, a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). The nonvolatile memory may be a storage class memory (SCM), a solid state drive (SSD), a hard disk drive (HDD), or the like. The storage class memory may be, for example, a nonvolatile memory (NVM), a phase-change memory (PCM), or a persistent memory.

In a possible implementation, the memory 402 exists independently of the processor 401. The memory 402 is connected to the processor 401 by using the bus 404, and is configured to store data, instructions, or program code. When invoking and executing the instructions or the program code stored in the memory 402, the processor 401 can implement the method for managing a shared cache provided in embodiments of this application.

In another possible implementation, the memory 402 and the processor 401 are integrated together.

The communications interface 403 is configured to connect the computing device 40 to another device (for example, the computing node shown in FIG. 2 or FIG. 3) by using a communications network. The communications network may be Ethernet, a radio access network (RAN), a wireless local area network (WLAN), or the like. The communications interface 403 includes a receiving unit configured to receive data/a packet and a sending unit configured to send data/a packet.

The bus 404 may be an industry standard architecture (ISA) bus, a peripheral component interconnect (PCI) bus, a peripheral component interconnect express (PCIe) bus, a compute express link (CXL), an extended industry standard architecture (EISA) bus, or the like. The bus may be classified as an address bus, a data bus, a control bus, or the like. For ease of representation, only one bold line is used to represent the bus in FIG. 4, but this does not mean that there is only one bus or only one type of bus.

It should be noted that the structure shown in FIG. 4 does not constitute a limitation on the computing device 40. In addition to the components shown in FIG. 4, the computing device 40 includes more or fewer components than those shown in FIG. 4, combines some components, or has different component arrangements.

With reference to the accompanying drawings, the following describes in detail the method for managing a shared cache provided in embodiments of this application.

In embodiments of this application, the shared cache is configured to cache data that IO requests initiated by a plurality of entities request to operate (for example, read or write). An example in which the IO requests initiated by the plurality of entities correspond to K types and the shared cache corresponds to N eviction algorithms is used below for description. In other words, the IO requests initiated by the plurality of entities include IO requests of the K types, and the N eviction algorithms are preconfigured for the shared cache. K and N each are an integer greater than 1.

It should be further understood that each IO request carries a logical address, and the logical address is a logical address to be accessed by the IO request. For example, the IO request reads to-be-read data stored in the logical address carried in the IO request, or the IO request writes to-be-written data into the logical address carried in the IO request. Therefore, in the following descriptions of embodiments of this application, a logical address carried in an IO request and a logical address accessed by the IO request may be interchangeably used.

Embodiment 1

In a scenario in which a read cache and a write cache in a shared cache are separated, the method for managing a shared cache provided in embodiments of this application may be used to manage a read cache in the shared cache, or may be used to manage a write cache in the shared cache. The separation between the read cache and the write cache in the shared cache means that the read cache and the write cache in the shared cache are isolated in a physical or software manner. The read cache is configured to cache data that an IO request initiated by an entity requests to read. The write cache is configured to cache data that an IO request initiated by an entity requests to write.

FIG. 5 is a schematic flowchart of a method for managing a shared cache according to an embodiment of this application. Optionally, the method may be applied to the CPU shown in FIG. 1, may be applied to the cache node shown in FIG. 2, or may be applied to the node shown in FIG. 3. The method may be performed by a computing device having the hardware structure shown in FIG. 4, and the method includes the following steps.

S101: Obtain IO requests initiated by a plurality of entities, and determine a type of each IO request, where the IO requests initiated by the plurality of entities include IO requests of K types.

A procedure in which the computing device performs the method for managing a shared memory provided in this embodiment of this application is performed in parallel with a procedure in which the IO requests initiated by the entities access the shared cache. Therefore, in a process in which the IO requests initiated by the plurality of entities access the shared cache, the computing device obtains copies of the IO requests that are initiated by the plurality of entities and that are used to access the shared cache. In this way, the computing device obtains the IO requests initiated by the plurality of entities, and the IO requests include the IO requests of the K types.

Figure 6:
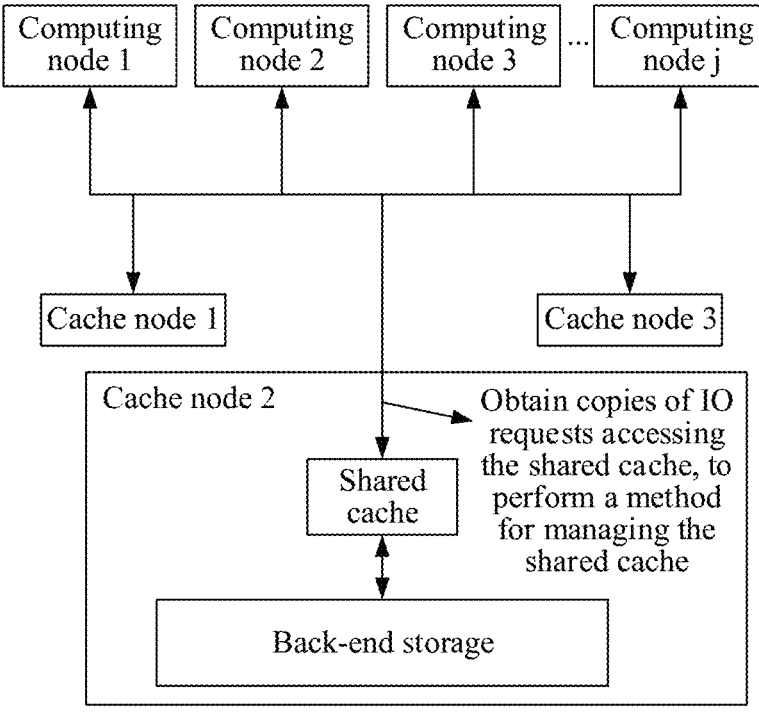
FIG. 6 is a schematic diagram of accessing a shared cache by IO requests initiated by entities according to an embodiment of this application.

As an example, with reference to FIG. 2, FIG. 6 is a schematic diagram of accessing a shared cache by IO requests initiated by entities. As shown in FIG. 6, a cache node 2 includes a shared cache, and all j computing nodes (including a computing node 1, a computing node 2, a computing node 3, . . . , and a computing node j) can access the shared cache in the cache node 2. In addition, the shared cache in the cache node 2 further communicates with a back-end storage (the back-end storage may be located inside the cache node 2, or may be located outside the cache node 2) of the cache node 2. In this way, in a data write scenario, the shared cache may cyclically flush, into the back-end storage, data written by the j computing nodes into the shared cache by using IO requests. In a data read scenario, the shared cache may load data in the back-end storage into a storage space of the shared cache in advance, so that the j computing nodes subsequently read the data by using IO requests. In addition, when the j computing nodes access the shared cache by using IO requests used to read data, if a cache miss occurs in the shared cache, the shared cache may load to-be-read data from the back-end storage, so that the j computing nodes read the to-be-read data. In this embodiment of this application, in a process in which the j computing nodes access the shared cache by using IO requests, the computing device obtains copies of the IO requests that are initiated by the j computing nodes and that are used to access the shared cache, to perform the method provided in this embodiment of this application.

It should be noted that when the method provided in this embodiment of this application is used to manage a read cache in the shared cache, the IO requests obtained by the computing device in S101 are IO read requests used to read data. When the method provided in this embodiment of this application is used to manage a write cache in the shared cache, the IO requests obtained by the computing device in S101 are IO write requests used to write data.

Further, the computing device determines the type of each obtained IO request.

In a possible implementation, the IO request initiated by the entity carries a type tag identifying a type to which the IO request belongs. In this way, the computing device determines the type of each IO request based on a type tag carried in each of the obtained IO requests.

Optionally, the type tag carried in the IO request may be a type tag added to the IO request when the entity initiates the IO request. In this case, the type tag carried in the IO request may be used to indicate the entity that initiates the IO request. In other words, the type of the IO request is obtained through classification based on the entity that initiates the IO request. In this way, the IO requests of the K types correspond to K entities, and IO requests initiated by a same entity have a same type tag, in other words, the IO requests initiated by the same entity belong to a same type. The entities may be different applications, different processing cores, or different computing nodes or client devices that access the shared cache, or the like. This is not limited herein.

In another possible implementation, the computing device may determine the type of each obtained IO request by using a classifier. The classifier is configured to classify the IO requests into the IO requests of the K types, and is specifically configured to classify IO requests carrying logical addresses with relatively high similarity under one type. The classifier is generated in advance based on features of accessing logical addresses by a specific quantity of IO requests. For detailed descriptions of generating, by the computing device, the classifier in advance based on the features of accessing the logical addresses by the specific quantity of IO requests, refer to the following descriptions. Details are not described herein.

Specifically, the computing device sequentially inputs logical addresses carried in all the obtained IO requests into the classifier, and the classifier may output a type identifier indicating the type of each IO request.

Optionally, after determining the type of the IO request by using the classifier, the computing device adds, to the IO request, the type identifier indicating the type of the IO request.

S102: Determine an access characteristic of accessing the shared cache by IO requests of each of the K types, where the access characteristic is respective relationships between hit rates and cache sizes of the IO requests of each of the K types in N eviction algorithms.

The N eviction algorithms are eviction algorithms preconfigured for the shared cache, in other words, the shared cache corresponds to the N eviction algorithms.

The computing device presets X cache sizes for the IO requests of each type. For IO requests of one type (for example, IO requests of a first type), the X cache sizes are X cache sizes preset for a cache corresponding to the IO requests of the first type. The cache corresponding to the IO requests of the first type is a partition that is in the shared cache and that is configured to cache data that the IO requests of the first type request to read, and a cache size of the cache corresponding to the IO requests of the first type is a size of the partition that is in the shared cache and that is configured to cache the data that the IO requests of the first type request to read. It may be understood that the cache size preset by the computing device for the IO requests of each type is less than a size of the shared cache.

It should be understood that, in this embodiment of this application, a rule of presetting, by the computing device, the X cache sizes for the IO requests of each type and a size interval between the X cache sizes are not specifically limited.

As an example, the computing device presets three cache sizes for the IO requests of the first type. Assuming that the size of the shared cache is 4 M, the three cache sizes preset by the computing device for the IO requests of the first type may be 1 M, 2 M, and 3 M.

Optionally, a quantity of cache sizes preset by the computing device for the IO requests of each of the K types may be X, in other words, the computing device presets a same quantity of cache sizes for the IO requests of all of the K types. Certainly, the computing device may alternatively preset different quantities of cache sizes for the IO requests of all of the K types. For example, a quantity of cache sizes preset by the computing device for the IO requests of the first type in the K types is 3, and a quantity of cache sizes preset by the computing device for IO requests of a second type in the K types is 4. The IO requests of the second type are IO requests of any type other than the first type in the K types.

For brief description, in this embodiment of this application, an example in which the computing device presets X cache sizes for the IO requests of each of the K types is used below for description.

Optionally, the respective relationships that are between the hit rates and the cache sizes of the IO requests of each of the K types using the N eviction algorithms and that are represented by the access characteristic may be represented by respective HRCs of the IO requests of each of the K types in the shared cache in the N eviction algorithms. Alternatively, the respective relationships that are between the hit rates and the cache sizes of the IO requests of each of the K types using the N eviction algorithms and that are represented by the access characteristic may be represented by respective MRCs of the IO requests of each of the K types in the shared cache in the N eviction algorithms. This is not limited in this embodiment of this application.

Specifically, after determining hit rates of the IO requests of each type in caches of different sizes in the N eviction algorithms based on the obtained IO requests of each of the K types, the computing device obtains the respective relationships between the hit rates and the cache sizes of the IO requests of each of the K types using the N eviction algorithms, in other words, obtains the access characteristic of accessing the shared cache by the IO requests of each of the K types.

A process in which the computing device determines, based on the obtained IO requests of each of the K types, the access characteristic of accessing the shared cache by the IO requests of each of the K types may be implemented in the following possible implementations.

In a first possible implementation, the computing device obtains, through simulation in the shared cache, the hit rates of the IO requests of each type in the caches of the different sizes in the N eviction algorithms, to obtain respective relationships between the hit rates and the cache sizes of the IO requests of each type in the N eviction algorithms, for example, obtain the respective HRCs or MRCs of the IO requests of each type in the N eviction algorithms.

Specifically, the computing device may simulate hit rates of sample IO requests of each type in caches of different sizes in the N eviction algorithms in the shared cache in a scale down manner, to obtain respective relationships between the hit rates and the cache sizes of the sample IO requests of each type in the N eviction algorithms, for example, obtain respective HRCs or MRCs of the sample IO requests of each type in the N eviction algorithms. Then, the computing device determines the respective relationships between the hit rates and the cache sizes of the sample IO requests of each type in the N eviction algorithms as the respective relationships between the hit rates and the cache sizes of the IO requests of each type in the N eviction algorithms. For example, the computing device determines the respective HRCs of the sample IO requests of each type in the N eviction algorithms as the respective HRCs of the IO requests of each type in the N eviction algorithms. Alternatively, the computing device determines the respective MRCs of the sample IO requests of each type in the N eviction algorithms as the respective MRCs of the IO requests of each type in the N eviction algorithms.

The sample IO requests of each type are IO requests obtained by the computing device through sampling based on the IO requests that are of each of the K types and that are obtained in S101. For a specific sampling process, refer to the following descriptions. Details are not described herein.

For detailed descriptions of a process in which the computing device simulates the hit rates of the sample IO requests of each type in the caches of the different sizes in the N eviction algorithms in the shared cache in the scale down manner, to obtain the respective relationships between the hit rates and the cache sizes of the sample IO requests of each type in the N eviction algorithms, refer to the following descriptions. Details are not described herein.

In a second possible implementation, the computing device determines the hit rates of the IO requests of each type in the caches of the different sizes in the N eviction algorithms based on a reuse distance of each of the IO requests of each type and different cache sizes, to obtain the respective relationships between the hit rates and the cache sizes of the IO requests of each type in the N eviction algorithms.

For example, for IO requests of a first type in the IO requests of the K types and a first eviction algorithm in the N eviction algorithms, the computing device may determine, based on a reuse distance of each of the IO requests of the first type and different cache sizes, hit rates obtained when the first eviction algorithm is applied to caches of different sizes for the IO requests of the first type, to obtain relationships between the hit rates and the cache sizes of the IO requests of the first type in the first eviction algorithm. The first eviction algorithm is any one of the N eviction algorithms.

Optionally, to save computing resources of the computing device and improve efficiency of the computing device, the computing device may determine hit rates of sample IO requests of each type in caches of different sizes in the N eviction algorithms based on a reuse distance of each of the sample IO requests of each type and different cache sizes, to obtain respective relationships between the hit rates and the cache sizes of the sample IO requests of each type in the N eviction algorithms. Then, the computing device determines the respective relationships between the hit rates and the cache sizes of the sample IO requests of each type in the N eviction algorithms as the respective relationships between the hit rates and the cache sizes of the IO requests of each type in the N eviction algorithms. The sample IO requests of each type are IO requests obtained by the computing device through sampling based on the IO requests that are of each of the K types and that are obtained in S101.

For example, for sample IO requests of a first type and the first eviction algorithm, the computing device may determine, based on a reuse distance of each of the sample IO requests of the first type and different cache sizes, hit rates obtained when the first eviction algorithm is applied to caches of different sizes for the sample IO requests of the first type, to obtain relationships between the hit rates and the cache sizes of the sample IO requests of the first type in the first eviction algorithm. Then, the computing device approximately determines the relationships between the hit rates and the cache sizes of the sample IO requests of the first type in the first eviction algorithm as the relationships between the hit rates and the cache sizes of the IO requests of the first type in the first eviction algorithm. For detailed descriptions of the reuse distance of the sample IO request, refer to the detailed descriptions of the reuse distance in the foregoing terms. Details are not described herein.

For detailed descriptions of determining, by the computing device based on the reuse distance of each of the sample IO requests of the first type and the different cache sizes, the hit rates obtained when the first eviction algorithm is applied to the caches of the different sizes for the sample IO requests of the first type, to obtain the relationships between the hit rates and the cache sizes of the sample IO requests of the first type in the first eviction algorithm, refer to the following descriptions. Details are not described herein.

It may be learned that, for IO requests of one type, in one eviction algorithm, the computing device may determine one group of relationships between different cache sizes and hit rates, namely, one HRC or MRC. Then, for IO requests of one type, in the N eviction algorithms, the computing device may determine N groups of relationships between cache sizes and hit rates, namely, N HRCs or MRCs. Then, for the IO requests of the K types, in the N eviction algorithms, the computing device may determine N×K groups of relationships between cache sizes and hit rates, namely, N×K HRCs or MRCs.

It should be noted that, the computing device may use the first possible implementation or the second possible implementation when determining the respective HRCs or MRCs of the sample IO requests of each type in the N eviction algorithms. Certainly, the computing device may obtain HRCs or MRCs of sample IO requests of one part of the types in one part of the eviction algorithms in the first possible implementation, and the computing device may determine HRCs or MRCs of sample IO requests of the other part of the types in the other part of the eviction algorithms in the second possible implementation. This is not limited in this embodiment of this application.

The following briefly describes a process in which the computing device obtains the sample IO requests of each type through sampling from the IO requests that are of each of the K types and that are obtained in S101.

Specifically, the computing device performs sampling in the obtained IO requests of each of the K types based on a preset sampling condition, to obtain the sample IO requests of each type. A logical address carried in the sample IO request meets the preset sampling condition.

The preset sampling condition is a sampling condition designed based on a preset sampling rate. The preset sampling rate is preset by the computing device. For example, the preset sampling rate is 0.01, that is, one sample IO request is sampled in 100 IO requests. It should be noted that, when the computing device performs sampling in the IO requests of each type based on the preset sampling condition designed based on the preset sampling rate, a sampling rate of sampling in the IO requests of each type may be the preset sampling rate.

As an example, if the preset sampling rate is L, a sample IO request that meets the preset sampling condition meets the following condition: A remainder obtained by dividing a hash value of a logical address carried in the sample IO request by a coefficient A is less than or equal to a product of the preset sampling rate L and the coefficient A. The hash value of the logical address may be obtained after the logical address is hashed based on any hash algorithm. This is not limited in this embodiment of this application. The coefficient A is a preset coefficient, and a value of A is not limited in this embodiment of this application.

It should be noted that, in IO requests of one type, the preset sampling condition can ensure that when the computing device obtains, through sampling from the IO requests of this type, a sample IO request that meets the preset sampling condition, any IO request that is in the IO requests of this type and that carries a same logical address as the sample IO request can be sampled by the computing device as a sample IO request. In other words, the preset sampling condition can ensure that when the computing device obtains, through sampling from the IO requests of this type, a sample IO request that meets the preset sampling condition, any IO request that is in the IO requests of this type and that accesses a same logical address as the sample IO request can be sampled by the computing device as a sample IO request. Therefore, any sampling condition that can ensure the foregoing sampling purpose should fall within the protection scope of embodiments of this application.

Specifically, for IO requests of any one of the K types (for example, IO requests of a first type), the computing device determines whether each of the IO requests of the first type meets the preset sampling condition. If an IO request meets the preset sampling condition, the computing device determines, as a sample IO request, the IO request that meets the preset sampling condition. In this way, the computing device may obtain a plurality of sample IO requests through sampling from the obtained IO requests of the first type based on the preset sampling rate.

As an example, for any one (for example, a first IO request) of the IO requests of the first type, the computing device first determines a hash value of a logical address carried in the first IO request, and further determines whether a remainder Y obtained by dividing the hash value by the coefficient A is less than or equal to the product P of the preset sampling rate L and the coefficient A. When Y is less than or equal to P, the computing device samples the first IO request, in other words, determines the first IO request as a sample IO request in the IO requests of the first type.

It may be understood that, in practice, because the IO requests initiated by the entities access the shared cache in real time, in this process, each time obtaining and determining a type of an IO request, the computing device determines whether the IO request meets the preset sampling condition, to determine whether to sample the IO request.

S103: Determine a partition size and an eviction algorithm of the IO requests of each type in the shared cache based on the access characteristic of the IO requests of each of the K types and a hit rate of the shared cache.

Specifically, the computing device may determine, based on the respective relationships (the access characteristic of the IO requests of each of the K types) that are between the hit rates and the cache sizes of the IO requests of each of the K types using the N eviction algorithms and that are determined by the computing device in S102, X hit rates that are of the IO requests of each type in each eviction algorithm and that correspond to X cache sizes. In this way, the computing device may determine, based on the X hit rates that are of the IO requests of each type in each eviction algorithm and that correspond to the X cache sizes, hit rates of the IO requests of the K types in the shared cache in different combinations. Herein, for detailed descriptions of the X cache sizes, refer to the foregoing descriptions. Details are not described herein again.

The different combinations are combinations that are of different cache sizes and different eviction algorithms and that correspond to the IO requests of each type. For example, if cache sizes preset by the computing device include X cache sizes, and eviction algorithms preconfigured for the shared cache include N eviction algorithms, combinations corresponding to IO requests of one type include X×N combinations.

It should be understood that, it may be learned, based on the respective relationships (the access characteristic of the IO requests of each of the K types) that are between the hit rates and the cache sizes of the IO requests of each of the K types using the N eviction algorithms and that are determined by the computing device in S102, that in one combination, IO requests of one type correspond to one hit rate of the IO requests of this type in the combination. Therefore, the computing device may obtain one hit rate of the IO requests of the K types in the shared cache based on a hit rate of the IO requests of each type in any combination.

Specifically, for IO requests of a first type in the IO requests of the K types, the computing device may determine, based on a hit rate of the IO requests of the first type in any combination (for example, a first combination) and a proportion of the IO requests of the first type in the IO requests of the K types, a hit rate of the IO requests of the first type in the shared cache in the first combination. For example, the computing device performs a product operation on the hit rate of the IO requests of the first type in the first combination and the proportion of the IO requests of the first type in the IO requests of the K types, to obtain the hit rate of the IO requests of the first type in the shared cache in the first combination. For example, assuming that the hit rate of the IO requests of the first type in the first combination is Z1, and the proportion of the IO requests of the first type in the IO requests of the K types is R1, the hit rate of the IO requests of the first type in the shared cache in the first combination is K1=Z1×R1.

The proportion of the IO requests of the first type in the IO requests of the K types is determined by the computing device based on a quantity of IO requests of the first type and a total quantity of IO requests of the K types. Optionally, after obtaining the IO requests that are of the K types and that are initiated by the entities and determining the type of each IO request, the computing device may determine a proportion of the IO requests of each type in the IO requests of the K types based on the total quantity of obtained IO requests and a quantity of IO requests of each type.

Similarly, the computing device may determine a hit rate of the IO requests of each type in the shared cache in any combination. Then, the computing device performs summation on K respective hit rates of the IO requests of the K types in the shared cache, to obtain the hit rate of the IO requests of the K types in the shared cache. The K hit rates used for summation are respectively respective hit rates of the IO requests of the K types in the shared cache in any combinations. For example, a value of K is 2. Assuming that a hit rate of IO requests of a first type in the shared cache in a first combination is K1, and a hit rate of IO requests of a second type in the shared cache in a second combination is K2, a hit rate of the IO requests of the K types in the shared cache is K1+K2.

It should be noted that when the computing device performs summation on the K respective hit rates of the IO requests of the K types in the shared cache, to obtain the hit rate of the IO requests of the K types in the shared cache, a sum of cache sizes of the IO requests of the K types is less than or equal to the size of the shared cache.

Then, for the IO requests of the K types, the computing device may obtain $(X×N)^K$ hit rates of the IO requests of the K types in the shared cache based on X×N respective hit rates of the IO requests of each type in X×N combinations.

As an example, a value of K is 2, a value of N is 2, and a value of X is 2. In this case, the IO requests obtained by the computing device include IO requests of a first type and IO requests of a second type, a proportion of the IO requests of the first type in the IO requests of the two types is R1, and a proportion of the IO requests of the second type in the IO requests of the two types is R2. Eviction algorithms preconfigured for the shared cache include a first eviction algorithm and a second eviction algorithm. Cache sizes preset by the computing device for the IO requests of each type include a cache size 1 and a cache size 2. In addition, the IO requests of each type correspond to four combinations, and the four combinations include: a combination 1 including the first eviction algorithm and the cache size 1, a combination 2 including the second eviction algorithm and the cache size 1, a combination 3 including the first eviction algorithm and the cache size 2, and a combination 4 including the second eviction algorithm and the cache size 2. In this way, on a premise that a sum of a cache size of the IO requests of the first type and a cache size of the IO requests of the second type is less than or equal to the size of the shared cache, the computing device may obtain, through calculation, the following $(X×N)^K$ ($4^2=16$) hit rates of the IO requests of the two types in the shared cache based on hit rates of the IO requests of each type in the X×N ($2×2=4$) combinations:

a hit rate 1 of the IO requests of the two types in the shared cache: a product (a hit rate of the IO requests of the first type in the shared cache in the combination 1) of a hit rate of the IO requests of the first type in the combination 1 and R1+a product (a hit rate of the IO requests of the second type in the shared cache in the combination 1) of a hit rate of the IO requests of the second type in the combination 1 and R2;

a hit rate 2 of the IO requests of the two types in the shared cache: a product (a hit rate of the IO requests of the first type in the shared cache in the combination 1) of a hit rate of the IO requests of the first type in the combination 1 and R1+a product (a hit rate of the IO requests of the second type in the shared cache in the combination 2) of a hit rate of the IO requests of the second type in the combination 2 and R2;

a hit rate 3 of the IO requests of the two types in the shared cache: a product (a hit rate of the IO requests of the first type in the shared cache in the combination 1) of a hit rate of the IO requests of the first type in the combination 1 and R1+a product (a hit rate of the IO requests of the second type in the shared cache in the combination 3) of a hit rate of the IO requests of the second type in the combination 3 and R2;

a hit rate 4 of the IO requests of the two types in the shared cache: a product (a hit rate of the IO requests of the first type in the shared cache in the combination 1) of a hit rate of the IO requests of the first type in the combination 1 and R1+a product (a hit rate of the IO requests of the second type in the shared cache in the combination 4) of a hit rate of the IO requests of the second type in the combination 4 and R2;

a hit rate 5 of the IO requests of the two types in the shared cache: a product (a hit rate of the IO requests of the first type in the shared cache in the combination 2) of a hit rate of the IO requests of the first type in the combination 2 and R1+a product (a hit rate of the IO requests of the second type in the shared cache in the combination 1) of a hit rate of the IO requests of the second type in the combination 1 and R2;

a hit rate 6 of the IO requests of the two types in the shared cache: a product (a hit rate of the IO requests of the first type in the shared cache in the combination 2) of a hit rate of the IO requests of the first type in the combination 2 and R1+a product (a hit rate of the IO requests of the second type in the shared cache in the combination 2) of a hit rate of the IO requests of the second type in the combination 2 and R2;

a hit rate 7 of the IO requests of the two types in the shared cache: a product (a hit rate of the IO requests of the first type in the shared cache in the combination 2) of a hit rate of the IO requests of the first type in the combination 2 and R1+a product (a hit rate of the IO requests of the second type in the shared cache in the combination 3) of a hit rate of the IO requests of the second type in the combination 3 and R2;

a hit rate 8 of the IO requests of the two types in the shared cache: a product (a hit rate of the IO requests of the first type in the shared cache in the combination 2) of a hit rate of the IO requests of the first type in the combination 2 and R1+a product (a hit rate of the IO requests of the second type in the shared cache in the combination 4) of a hit rate of the IO requests of the second type in the combination 4 and R2;

a hit rate 9 of the IO requests of the two types in the shared cache: a product (a hit rate of the IO requests of the first type in the shared cache in the combination 3) of a hit rate of the IO requests of the first type in the combination 3 and R1+a product (a hit rate of the IO requests of the second type in the shared cache in the combination 1) of a hit rate of the IO requests of the second type in the combination 1 and R2;

a hit rate 10 of the IO requests of the two types in the shared cache: a product (a hit rate of the IO requests of the first type in the shared cache in the combination 3) of a hit rate of the IO requests of the first type in the combination 3 and R1+a product (a hit rate of the IO requests of the second type in the shared cache in the combination 2) of a hit rate of the IO requests of the second type in the combination 2 and R2;

a hit rate 11 of the IO requests of the two types in the shared cache: a product (a hit rate of the IO requests of the first type in the shared cache in the combination 3) of a hit rate of the IO requests of the first type in the combination 3 and R1+a product (a hit rate of the IO requests of the second type in the shared cache in the combination 3) of a hit rate of the IO requests of the second type in the combination 3 and R2;

a hit rate 12 of the IO requests of the two types in the shared cache: a product (a hit rate of the IO requests of the first type in the shared cache in the combination 3) of a hit rate of the IO requests of the first type in the combination 3 and R1+a product (a hit rate of the IO requests of the second type in the shared cache in the combination 4) of a hit rate of the IO requests of the second type in the combination 4 and R2;

a hit rate 13 of the IO requests of the two types in the shared cache: a product (a hit rate of the IO requests of the first type in the shared cache in the combination 4) of a hit rate of the IO requests of the first type in the combination 4 and R1+a product (a hit rate of the IO requests of the second type in the shared cache in the combination 1) of a hit rate of the IO requests of the second type in the combination 1 and R2;

a hit rate 14 of the IO requests of the two types in the shared cache: a product (a hit rate of the IO requests of the first type in the shared cache in the combination 4) of a hit rate of the IO requests of the first type in the combination 4 and R1+a product (a hit rate of the IO requests of the second type in the shared cache in the combination 2) of a hit rate of the IO requests of the second type in the combination 2 and R2;

a hit rate 15 of the IO requests of the two types in the shared cache: a product (a hit rate of the IO requests of the first type in the shared cache in the combination 4) of a hit rate of the IO requests of the first type in the combination 4 and R1+a product (a hit rate of the IO requests of the second type in the shared cache in the combination 3) of a hit rate of the IO requests of the second type in the combination 3 and R2; and a hit rate 16 of the IO requests of the two types in the shared cache: a product (a hit rate of the IO requests of the first type in the shared cache in the combination 4) of a hit rate of the IO requests of the first type in the combination 4 and R1+a product (a hit rate of the IO requests of the second type in the shared cache in the combination 4) of a hit rate of the IO requests of the second type in the combination 4 and R2.

Further, the computing device determines a maximum hit rate of the IO requests of the K types in the shared cache; and determines, as the partition size of the IO requests of each type in the shared cache, a cache size indicated by a combination corresponding to each type when the maximum hit rate is obtained, and determines, as the eviction algorithm of the IO requests of each type in the shared cache, an eviction algorithm indicated by the combination corresponding to each type when the maximum hit rate is obtained.

For example, assuming that the hit rate 15 of the IO requests of the two types in the shared cache is the maximum hit rate of the IO requests of the two types in the shared cache, the computing device determines, as a partition size of the IO requests of the first type in the shared cache, the cache size 2 indicated by the combination 4 corresponding to the IO requests of the first type when the maximum hit rate is obtained, and determines, as an eviction algorithm of the IO requests of the first type in the shared cache, the second eviction algorithm indicated by the combination 4 corresponding to the IO requests of the first type when the maximum hit rate is obtained. In addition, the computing device determines, as a partition size of the IO requests of the second type in the shared cache, the cache size 2 indicated by the combination 3 corresponding to the IO requests of the second type when the maximum hit rate is obtained, and determines, as an eviction algorithm of the IO requests of the second type in the shared cache, the first eviction algorithm indicated by the combination 3 corresponding to the IO requests of the second type when the maximum hit rate is obtained.

Optionally, in a possible implementation, the computing device may determine, based on the X hit rates that are determined based on the IO requests of each type in each eviction algorithm and that correspond to the X cache sizes, a maximum hit rate of the IO requests of the K types in the shared cache in different combinations by solving the following formula (2) under a constraint of a formula (1):

$$\sum_{i=1}^{K} m_i \leq M; \text{ and} \qquad \text{Formula (1)}$$

$$\underset{\substack{m\in[0,M] \\ p\in\{P_1,P_2,\ldots,P_N\}}}{\text{argmax}} \sum_{i=1}^{K} HRC_i^{p_i}(m_i) \times R_i, \text{ where} \qquad \text{Formula (2)}$$

m represents a preset cache size, an m quantity is X preset by the computing device, and M represents the size of the shared cache. Therefore, a value of m meets $m\in[0, M]$. K represents a quantity of types of the IO requests. Alternatively, it is understood that K represents a quantity of partitions in the shared cache. It should be understood that IO requests of one type correspond to one partition in the shared cache, in other words, one partition in the shared cache is configured to cache data of IO requests of one type. i represents an $i^{th}$ partition in K partitions. Alternatively, it is understood that i represents IO requests of an $i^{th}$ type in the IO requests of the K types. $m_i$ represents a cache size corresponding to the $i^{th}$ partition in the shared cache. p represents an eviction algorithm, $\{P_1, P_2, \ldots, P_N\}$ represents N eviction algorithms, $p_i$ represents an eviction algorithm configured for the $i^{th}$ partition, and any one of $\{P_1, P_2, \ldots, P_N\}$ is taken as $p_i$. Ri represents a proportion of the IO requests of the $i^{th}$ type in all the IO requests.

Further, the formula (1) represents a sum of K cache sizes of the IO requests of the K types in the shared cache, where the sum is less than or equal to the size of the shared cache.

$$HRC_i^{p_i}$$

in the formula (2) represents a hit rate that is of the IO requests of the $i^{th}$ type and that is obtained when a cache size is $m_i$ in the eviction algorithm $p_i$, where $m_i$ and $p_i$ are one combination described above.

$$HRC_i^{p_i}(m_i) \times R_i$$

represents a hit rate of the IO requests of the $i^{th}$ type in the shared cache in a combination including $m_i$ and $p_i$. Then, $$\sum_{i=1}^{K} HRC_i^{p_i}(m_i) \times R_i$$

$R_i$ in the formula (2) represents hit rates of the IO requests of the K types in the shared cache in the different combinations. argmax in the formula (2) represents taking a maximum value of $$\sum_{i=1}^{K} HRC_i^{p_i}(m_i) \times R_i,$$

in other words, argmax represents taking the maximum hit rate of the IO requests of the K types in the shared cache in the different combinations.

Therefore, by solving the formula (2) under the constraint of the formula (1), the computing device may determine the maximum hit rate of the IO requests of the K types in the shared cache in the different combinations; and determine, as a partition size of the IO requests of each type in the shared cache, a cache size indicated by a combination corresponding to the IO requests of each type when the maximum hit rate is obtained, and determine, as an eviction algorithm of the IO requests of each type in the shared cache, an eviction algorithm indicated by the combination corresponding to the IO requests of each type when the maximum hit rate is obtained.

In another possible implementation, the computing device may determine, based on the X hit rates that are determined based on the IO requests of each type in each eviction algorithm and that correspond to the X cache sizes, a minimum miss rate of the IO requests of the K types in the shared cache in different combinations by solving the following formula (3) under the constraint of the formula (1):

$$\underset{\substack{m\in[0,M] \\ p\in\{P_1,P_2,\ldots,P_N\}}}{\text{argmin}} \sum_{i=1}^{K} MRC_i^{p_i}(m_i) \times R_i \qquad \text{Formula (3)}$$

For detailed descriptions of m, M, K, i, $m_i$, p, $\{P_1, P_2, \ldots, P_N\}$, $p_i$, and Ri, refer to the descriptions in the foregoing possible implementation. Details are not described herein again.

$$MRC_i^{p_i}$$

in the formula (3) represents a miss rate that is of the IO requests of the $i^{th}$ type and that is obtained when a cache size is $m_i$ in the eviction algorithm $p_i$, where $m_i$ and $p_i$ are one combination described above.

$$MRC_i^{p_i}(m_i) \times R_i$$

represents a miss rate of the IO requests of the $i^{th}$ type in the shared cache in a combination including $m_i$ and $p_i$. Then, $$\sum_{i=1}^{K} MRC_i^{p_i}(m_i) \times R_i$$

in the formula (3) may represent miss rates of the IO requests of the K types in the shared cache in the different combinations. argmin in the formula (3) represents taking a minimum value of $$\sum_{i=1}^{K} MRC_i^{p_i}(m_i) \times R_i,$$

in other words, argmin represents taking the minimum miss rate of the IO requests of the K types in the shared cache in the different combinations.

Therefore, by solving the formula (3) under the constraint of the formula (1), the computing device may determine the minimum miss rate of the IO requests of the K types in the shared cache in the different combinations. Correspondingly, the computing device determines a minimum miss rate of the IO requests of the K types in the shared cache in the different combinations. In this way, the computing device may determine, as a partition size of the IO requests of each type in the shared cache, a cache size indicated by a combination corresponding to the IO requests of each type when the minimum miss rate is obtained, and determine, as an eviction algorithm of the IO requests of each type in the shared cache, an eviction algorithm indicated by the combination corresponding to the IO requests of each type when the minimum miss rate is obtained.

S104: Configure a cache size of the IO requests of each type in the shared cache as the determined partition size of the IO requests of each type in the shared cache, and configure an eviction algorithm of the IO requests of each type in the shared cache as the determined eviction algorithm of the IO requests of each type in the shared cache.

Specifically, after determining the partition size and the eviction algorithm of the IO requests of each type in the shared cache, the computing device configures the cache size of the IO requests of each type in the shared cache as the determined partition size of the IO requests of each type in the shared cache, and configures the eviction algorithm of the IO requests of each type in the shared cache as the determined eviction algorithm of the IO requests of each type in the shared cache.

Then, after the cache size and the eviction algorithm of the IO requests of each type in the shared cache are configured, the IO requests that are of the different types and that are initiated by the entities can access the shared cache in the configuration.

Specifically, in a data read scenario, for IO requests of any type (for example, IO requests of a first type) that are initiated by entities, in a process in which the IO requests of the first type access the shared cache in the configuration, when monitoring that a size of data cached in the shared cache by the IO requests of the first type exceeds an eviction threshold, the shared cache performs, based on an eviction algorithm configured for the IO requests of the first type in the shared cache, eviction on the data cached in the shared cache by the IO requests of the first type.

In a data write scenario, for IO requests of any type (for example, IO requests of a first type) that are initiated by entities, in a process in which the IO requests of the first type access the shared cache in the configuration, in a possible implementation, when monitoring that a size of data cached in the shared cache by the IO requests of the first type exceeds an eviction threshold, the shared cache performs, based on an eviction algorithm configured for the IO requests of the first type in the shared cache, eviction on the data cached in the shared cache by the IO requests of the first type. In another possible implementation, the shared cache cyclically performs, based on the eviction algorithm, eviction on data cached in the shared cache by the IO requests of the first type.

In conclusion, according to the method for managing a shared cache in S101 to S104, the corresponding partition size and cache eviction algorithm can be determined in the shared cache for the IO requests of each type based on the access characteristic of the IO requests of each type, to improve cache performance of the IO requests of each type, thereby improving cache performance of the entire shared cache.

When the method in S101 to S104 is used to manage the read cache in the shared cache, a read hit rate of an IO read request in the shared cache can be improved based on the partition size and the eviction algorithm that are determined for the IO requests of each type in the method provided in this embodiment of this application, thereby improving data read efficiency. When the method in S101 to S104 is used to manage the write cache in the shared cache, a write hit rate of an IO write request in the shared cache can be improved based on the partition size and the eviction algorithm that are determined for the IO requests of each type in the method provided in this embodiment of this application, thereby reducing a quantity of times that the shared cache performs flushing into a back-end storage unit, in other words, saving a data transmission bandwidth between the shared cache and the back-end storage unit.

In some embodiments, the method in S101 to S104 may be cyclically performed. In this case, the IO requests obtained by the computing device in S101 are IO requests that are initiated by entities and that are obtained by the computing device in a cycle (for example, a current cycle). Further, the computing device performs S102 and S103 based on the obtained IO requests in the cycle, to determine a partition size and an eviction algorithm of IO requests of each type in the shared cache. In this case, in S104, the computing device may cyclically configure the shared cache based on a partition size and an eviction algorithm that are of the IO requests of each type in the shared cache and that are determined in each cycle. In other words, the computing device may cyclically adjust each partition size of the shared cache and a corresponding eviction algorithm based on the partition size and the eviction algorithm that are of the IO requests of each type in the shared cache and that are determined in each cycle.

It should be noted that, when the method in S101 to S104 is performed for the first time, the shared cache may be configured based on a partition size and an eviction algorithm that are specified by a user, or the shared cache is a pooled cache. This is not limited in this embodiment of this application.

It may be learned that, when the method in S101 to S104 is cyclically performed, the shared cache may cyclically adjust a cache size and an eviction algorithm of the IO requests of each type in the shared cache based on a cache size and an eviction algorithm that are of the IO requests of each of the K types in the shared cache and that are cyclically determined by the computing device, to ensure a hit rate of the IO requests in the shared cache in time domain, in other words, ensure cache performance of the shared cache in time domain.

For sample IO requests of a first type that are obtained through sampling from IO requests of a first type, the following uses a first eviction algorithm in the N eviction algorithms as an example to describe the process in which "the computing device simulates the hit rates of the sample IO requests of each type in the caches of the different sizes in the N eviction algorithms in the shared cache in the scale down manner, to obtain the respective relationships between the hit rates and the cache sizes of the sample IO requests of each type in the N eviction algorithms" in S102.

For descriptions of the IO requests of the first type, the sample IO requests of the first type, and the first eviction algorithm, refer to the foregoing related descriptions. Details are not described herein again.

As an example, assuming that a quantity of cache sizes preset by the computing device for the IO requests of the first type is 3 (a value of X is 3) and the cache sizes are respectively 1 M, 2 M, and 3 M, and a preset sampling rate L at which the computing device performs sampling in the IO requests of the first type is 0.01, the computing device determines that corresponding cache sizes used to simulate hit rates of applying the first eviction algorithm to caches of different sizes for the sample IO requests of the first type are 0.01 M (1 M×0.01), 0.02 M (2 M×0.01), and 0.03 M (3 M×0.01). In this way, the computing device applies for caches (referred to as simulated caches below) whose sizes are 0.01 M, 0.02 M, and 0.03 M from the shared cache for the sample IO requests of the first type, to respectively simulate hit rates obtained when the first eviction algorithm is applied to the three cache spaces for the sample IO requests of the first type, so that a hit rate obtained when the first eviction algorithm is applied, for the sample IO requests of the first type apply, to a cache whose cache size is 0.01 M, a hit rate obtained when the first eviction algorithm is applied, for the sample IO requests of the first type, to a cache whose cache size is 0.02 M, and a hit rate obtained when the first eviction algorithm is applied, for the sample IO requests of the first type, to a cache whose cache size is 0.03 M can be obtained, and then relationships between the hit rates and the cache sizes of the sample IO requests of the first type in the first eviction algorithm can be obtained, in other words, an HRC of the sample IO requests of the first type in the first eviction algorithm is obtained.

For example, for a simulated cache 1 whose cache size is 0.01 M and for which the computing device applies from the shared cache for the sample IO requests of the first type, the computing device may sequentially indicate all of the sample IO requests of the first type to access the simulated cache 1, and collect statistics on a quantity of hit sample IO requests.

Specifically, after simulation starts, the computing device may first indicate the first sample IO request in the sample IO requests of the first type to access the simulated cache 1. Because the simulated cache 1 is empty in this case, the computing device caches a logical address of the first sample IO request in the simulated cache 1. Then, the computing device indicates the second sample IO request in the sample IO requests of the first type to access the simulated cache 1. If a logical address of the second sample IO request is the same as the logical address of the first sample IO request, it indicates that the second sample IO request is hit in the simulated cache 1. If a logical address of the second sample IO request is different from the logical address of the first sample IO request, it indicates that the second sample IO request is missed in the simulated cache 1. In this case, the computing device caches the logical address of the second sample IO request in the simulated cache 1. By analogy, the computing device indicates all of the sample IO requests of the first type to sequentially access the simulated cache 1, and collects statistics on the quantity of hit sample IO requests. It should be noted that the computing device further monitors, in a simulation process, a size of logical addresses stored in the simulated cache 1. When the size of logical addresses stored in the simulated cache 1 exceeds a specific threshold, a part of the logical addresses in the simulated cache 1 are evicted (for example, deleted or set to be invalid) by using the first eviction algorithm.

Then, the computing device obtains, through calculation, a hit rate of the sample IO requests of the first type in the simulated cache 1 based on a total IO quantity of the sample IO requests of the first type and the quantity of hit sample IO requests. Similarly, the computing device simulates and collects statistics on a quantity of hit sample IO requests in the sample IO requests of the first type in a simulated cache 2 whose cache size is 0.02 M, and obtains, through calculation, a hit rate of the sample IO requests of the first type in the simulated cache 2 based on the total IO quantity of the sample IO requests of the first type and the quantity of hit sample IO requests. In addition, the computing device simulates and collects statistics on a quantity of hit sample IO requests in the sample IO requests of the first type in a simulated cache 3 whose cache size is 0.03 M, and obtains, through calculation, a hit rate of the sample IO requests of the first type in the simulated cache 3 based on the total IO quantity of the sample IO requests of the first type and the quantity of hit sample IO requests.

In this way, if the computing device presets X cache sizes for the IO requests of the first type, the computing device may determine X hit rates that correspond to the X cache sizes and that are obtained when the first eviction algorithm is applied for the sample IO requests of the first type. Therefore, the computing device obtains relationships between the hit rates and the cache sizes of the sample IO requests of the first type in the first eviction algorithm, in other words, obtains an HRC of the sample IO requests of the first type in the first eviction algorithm.

Optionally, the computing device may first determine a quantity of missed sample IO requests based on the total IO quantity of the sample IO requests of the first type and the quantity of hit sample IO requests, and then obtain, through calculation, a miss rate of the sample IO requests of the first type in the simulated cache 1 based on the total IO quantity of the sample IO requests of the first type and the quantity of missed sample IO requests. Similarly, the computing device simulates and collects statistics on the quantity of hit sample IO requests in the sample IO requests of the first type in the simulated cache 2; and first determines a quantity of missed sample IO requests based on the total IO quantity of the sample IO requests of the first type and the quantity of hit sample IO requests, and then obtains, through calculation, a miss rate of the sample IO requests of the first type in the simulated cache 2 based on the total IO quantity of the sample IO requests of the first type and the quantity of missed sample IO requests. In addition, the computing device simulates and collects statistics on the quantity of hit sample IO requests in the sample IO requests of the first type in the simulated cache 3; and first determines a quantity of missed sample IO requests based on the total IO quantity of the sample IO requests of the first type and the quantity of hit sample IO requests, and then obtains, through calculation, a miss rate of the sample IO requests of the first type in the simulated cache 3 based on the total IO quantity of the sample IO requests of the first type and the quantity of missed sample IO requests.

In this way, if the computing device presets X cache sizes for the IO requests of the first type, the computing device may determine X miss rates that correspond to the X cache sizes and that are obtained when the first eviction algorithm is applied for the sample IO requests of the first type. Therefore, the computing device obtains relationships between the miss rates and the cache sizes of the sample IO requests of the first type in the first eviction algorithm, in other words, obtains an MRC of the sample IO requests of the first type in the first eviction algorithm.

It should be noted that, each time simulation starts, the simulated cache for which the computing device applies for the sample IO requests is empty. This is equivalent to a state obtained after the cache is restarted after a power failure (the cache is cold started). Therefore, after determining an HRC of the sample IO requests of each type, the computing device may properly increase a hit rate in the HRC curve, or after determining an MRC of the sample IO requests of each type, properly decrease a miss rate in the MRC curve, to compensate for a cache miss caused by a cold start of the cache. It should be understood that, in this embodiment of this application, a hit rate that is of IO requests and that is obtained when data is cached in a cache actually needs to be simulated, and a hit rate simulated when the cache is initially empty is usually lower than the hit rate obtained when the data is cached in the cache. Therefore, in this embodiment of this application, a hit rate in a simulated HRC or a miss rate in a simulated MRC is compensated.

In this embodiment of this application, a specific compensation value for performing cold start compensation on the hit rate in the simulated HRC or the miss rate in the simulated MRC may be determined based on the sample IO requests of each type that are used to simulate the HRC or the MRC. For example, in this embodiment of this application, a quantity of sample IO requests missed within preset duration when simulation is started in an applied simulated cache for the sample IO requests of the first type may be used as the specific compensation value of the hit rate in the simulated HRC or the miss rate in the simulated MRC. Herein, the preset duration is not specifically limited in this embodiment of this application, and a specific method for determining the compensation value is not limited either.

It should be further noted that, when an IO request initiated by an entity accesses the shared cache, a data prefetch mechanism may be used. That is, the entity loads, into the shared cache in advance, data that may be accessed in a future period of time. Therefore, when the IO request subsequently initiated by the entity accesses the prefetched data, the IO request is definitely hit. Therefore, a hit rate of an IO request in the prefetch mechanism is higher than a hit rate that is of the IO request and that is obtained when the prefetch mechanism is not used. Therefore, after determining an HRC of the sample IO requests of each type, the computing device may properly decrease a hit rate in the HRC curve, or after determining an MRC of the sample IO requests of each type, properly increase a miss rate in the MRC curve, to reduce impact of the prefetch mechanism on the hit rate of the IO request.

A specific value for decreasing the hit rate in the simulated HRC in this embodiment of this application (or a specific value for increasing the miss rate in the simulated MRC n this embodiment of this application) may be a quantity of sample IO requests that access prefetched data and that are in the sample IO requests of each type that are used to simulate the HRC or the MRC. It should be understood that when an IO request initiated by an entity accesses prefetched data, the entity tags a prefetch identifier in the IO request, to indicate that data accessed by the IO request is prefetched. Therefore, the computing device only needs to collect statistics on the quantity of sample IO requests that access prefetched data and that are in the sample IO requests of each type, to determine the specific value for decreasing the hit rate in the simulated HRC (or the specific value for increasing the miss rate in the simulated MRC in this embodiment of this application).

Similarly, the computing device may simulate the respective relationships between the hit rates and the cache sizes of the sample IO requests of the first type in the N eviction algorithms, and simulate the respective relationships between the hit rates and the cache sizes of the sample IO requests of each type in the N eviction algorithms.

Further, the computing device determines the respective simulated relationships between the hit rates and the cache sizes of the sample IO requests of each type in the N eviction algorithms as the respective relationships between the hit rates and the cache sizes of the IO requests of each type in the N eviction algorithms. For example, the computing device determines the respective HRCs of the sample IO requests of each type in the N eviction algorithms as the respective HRCs of the IO requests of each type in the N eviction algorithms. Alternatively, the computing device determines the respective MRCs of the sample IO requests of each type in the N eviction algorithms as the respective MRCs of the IO requests of each type in the N eviction algorithms.

The following describes a detailed process of "determining, by the computing device based on the reuse distance of each of the sample IO requests of the first type and the different cache sizes, the hit rates obtained when the first eviction algorithm is applied to the caches of the different sizes for the sample IO requests of the first type, to obtain the relationships between the hit rates and the cache sizes of the sample IO requests of the first type in the first eviction algorithm" in S102.

Specifically, the computing device may determine the reuse distance of each of the sample IO requests of the first type based on a logical address accessed by each of the sample IO requests of the first type. Then, in the sample IO requests of the first type, the computing device collects statistics on a quantity of same reuse distances in reuse distances of all the sample IO requests, in other words, collects statistics on a frequency of each reuse distance.

As an example, it is assumed that the sample IO requests of the first type include 10 sample IO requests, logical addresses sequentially accessed by the 10 sample IO requests are respectively (a, b, c, d, a, d, a, c, b, a), and reuse distances that are of all of the 10 sample IO requests and that are obtained by the computing device through statistics collection are respectively ($\infty$, $\infty$, $\infty$, $\infty$, 3, 1, 1, 2, 3, 2). Then, the computing device collects statistics on a quantity of same reuse distances based on a reuse distance of each of the 10 sample IO requests. A quantity (frequency) of reuse distances $\infty$ is 4, a quantity (frequency) of reuse distances 1 is 2, a quantity (frequency) of reuse distances 2 is 2, and a quantity (frequency) of reuse distances 3 is 2.

Further, the computing device determines hit rates of the sample IO requests of the first type in different cache sizes based on a preset rule and the quantity that is of same reuse distances of the sample IO requests of the first type and that is obtained through statistics collection, to obtain respective relationships between the hit rates and the cache sizes of the sample IO requests of the first type in the first eviction algorithm. The preset rule is designed based on the eviction algorithm. One eviction algorithm corresponds to one preset rule, and the N eviction algorithms correspond to N preset rules. A specific design of the preset rule corresponding to the eviction algorithm is not limited in this embodiment of this application.

For example, the first eviction algorithm is a least recently used (least recently used, LRU) algorithm. For the sample IO requests of the first type, a preset rule corresponding to LRU may be: determining a quantity of reuse distances less than a preset value as a hit quantity that is of the sample IO requests of the first type and that is obtained when a cache size is a size of data that sample IO requests whose quantity is the preset value request to access. Herein, the computing device may determine, in advance based on a value of each of X preset cache sizes and a size of data accessed by a single sample IO request, a preset value corresponding to each cache size. For example, if one of the X cache sizes is 1 M, and the size of the data accessed by a single sample IO request is 4 K, preset value=1 M/4 K=256. In this way, the computing device may determine X hit quantities that correspond to the X cache sizes and that are obtained when the first eviction algorithm is applied for the sample IO requests of the first type. For descriptions of the X cache sizes, refer to the foregoing descriptions. Details are not described herein again.

Optionally, in this embodiment of this application, all sample IO requests may access data of a same size, for example, 4 K, by default. This is not limited. In this case, a size of data that a single sample IO request requests to access is preset in the computing device. Optionally, the computing device may determine, based on a quantity of sample IO requests included in the sample IO requests of the first type and a total size of data that the sample IO requests of the first type request to access, an average size of the data that all the sample IO requests request to access, and use the average size as the size of the data that a single sample IO request requests to access. This is not limited in this embodiment of this application.

As an example, it is assumed that the sample IO requests of the first type include 10 sample IO requests, and a quantity that is of reuse distances œ and that is obtained through statistics collection based on the 10 sample IO requests is 4, a quantity that is of reuse distances 1 and that is obtained through statistics collection based on the 10 sample IO requests is 2, a quantity that is of reuse distances 2 and that is obtained through statistics collection based on the 10 sample IO requests is 2, and a quantity that is of reuse distances 3 and that is obtained through statistics collection based on the 10 sample IO requests is 2.

If a preset value is 1, the computing device determines that there is no reuse distance less than 1. Therefore, the computing device determines that a hit quantity of the sample IO requests of the first type is 0 when a cache size is a size of data that one sample IO request requests to access.

If a preset value is 2, the computing device may determine a quantity 2 (the quantity 2 of reuse distances 1) of reuse distances less than 2 as a hit quantity that is of the sample IO requests of the first type and that is obtained when a cache size is a size of data that two sample IO requests request to access.

If a preset value is 3, the computing device may determine a quantity 4 (a sum (2+2) of the quantity 2 of reuse distances 1 and the quantity 2 of reuse distances 2) of reuse distances less than 3 as a hit quantity that is of the sample IO requests of the first type and that is obtained when a cache size is a size of data that three sample IO requests request to access.

If a preset value is 4, the computing device may determine a quantity 6 (a sum (2+2+2) of the quantity 2 of reuse distances 1, the quantity 2 of reuse distances 2, and the quantity 2 of reuse distances 3) of reuse distances less than 4 as a hit quantity that is of the sample IO requests of the first type and that is obtained when a cache size is a size of data that four sample IO requests request to access.

Then, the computing device may determine hit quantities of the sample IO requests of the first type in different cache sizes in the LRU algorithm based on different preset values, the preset rule corresponding to the LRU algorithm, and the quantity that is of same reuse distances in the sample IO requests of the first type and that is obtained through statistics collection. Further, the computing device may obtain, through calculation based on the determined hit quantities and the quantity of sample IO requests of the first type, hit rates of the sample IO requests of the first type in the different cache sizes in the LRU algorithm. In this way, for the X cache sizes preset by the computing device for the IO requests of the first type, the computing device determines X hit rates that correspond to the X cache sizes and that are obtained when the LRU algorithm is applied for the sample IO requests of the first type. Therefore, the computing device obtains relationships between the hit rates and the cache sizes of the sample IO requests of the first type in the LRU algorithm, in other words, obtains an HRC of the sample IO requests of the first type in the LRU algorithm.

Optionally, after determining the hit quantities of the sample IO requests of the first type in the different cache sizes in the LRU algorithm, the computing device may determine miss quantities of the sample IO requests of the first type in the different cache sizes in the LRU algorithm based on the total quantity of sample IO requests of the first type and the hit quantities of the sample IO requests of the first type in the different cache sizes in the LRU algorithm. Then, the computing device obtains, through calculation, miss rates of the sample IO requests of the first type in the different cache sizes in the LRU algorithm based on the total quantity of sample IO requests of the first type and the miss quantities of the sample IO requests of the first type in the different cache sizes in the LRU algorithm. In this way, for the X cache sizes preset by the computing device for the IO requests of the first type, the computing device determines X miss rates that correspond to the X cache sizes and that are obtained when the LRU algorithm is applied for the sample IO requests of the first type. Therefore, the computing device obtains relationships between the miss rates and the cache sizes of the sample IO requests of the first type in the LRU algorithm, in other words, obtains an MRC of the sample IO requests of the first type in the LRU algorithm.

Similarly, the computing device may respectively determine hit quantities (or miss quantities) of the sample IO requests of each type in the different cache sizes in the N eviction algorithms based on different preset values, the N preset rules corresponding to the N eviction algorithms, and a quantity of same reuse distances of the sample IO requests of each type. Further, the computing device may obtain, through calculation, hit rates (or miss rates) of the sample IO requests of each type in the different cache sizes in the N eviction algorithms based on the determined hit quantities (or miss quantities) and the quantity of sample IO requests of each type. In this way, the computing device obtains respective relationships between the hit rates and the cache sizes (or relationships between the miss rates and the cache sizes) of the sample IO requests of each type in the N eviction algorithms, in other words, obtains respective HRCs (MRCs) of the sample IO requests of each type in the N eviction algorithms.

The following describes a process of "generating, by the computing device, the classifier in advance based on the features of accessing the logical addresses by the specific quantity of IO requests" in S101.

Figure 7:
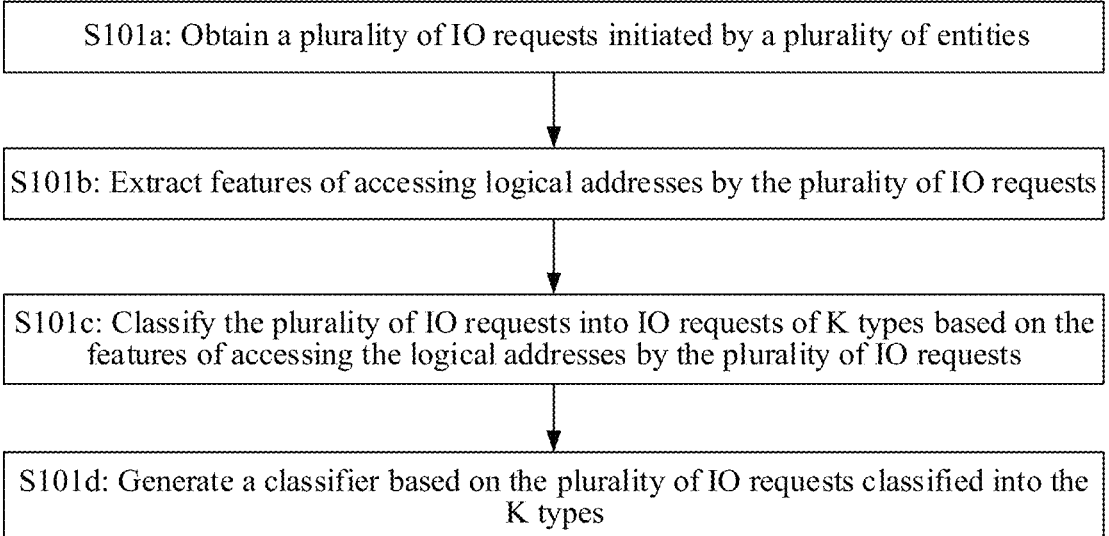
FIG. 7 is a schematic flowchart of a classifier generation method according to an embodiment of this application.

Specifically, before S101, the method provided in this embodiment of this application further includes a classifier generation method shown in FIG. 7. As shown in FIG. 7, before S101, the method provided in this embodiment of this application further includes S101a to S101d.

S101a: Obtain a plurality of IO requests initiated by a plurality of entities.

For descriptions of obtaining the plurality of IO requests by the computing device, refer to the related descriptions of obtaining the IO requests initiated by the entities in S101. Details are not described again.

Optionally, when the method in S101 to S104 is cyclically performed, and a cycle of performing the method in S101 to S104 is, for example, a first cycle, in a possible implementation, the plurality of IO requests obtained by the computing device in S101a are a plurality of IO requests obtained by the computing device in a first time period of the first cycle. In this case, the IO requests that are of the K types and that are obtained by the computing device in S101 are IO requests that are of K types and that are obtained by the computing device in a second time period of the first cycle. The first time period is a time period that starts from a start moment of the first cycle and whose duration is preset duration in the first cycle. The second time period is a remaining time period other than the first time period in the first cycle. Herein, specific values of duration of the first cycle and the preset duration are not limited in this embodiment of this application.

As an example, assuming that the first cycle is one hour, the start moment of the first cycle is 10:00, and the preset duration is 10 minutes, the first time period is a time period from 10:00 to 10:10, and the second time period is a time period from 10:11 to 11:00. In this way, the plurality of IO requests obtained by the computing device in S101$a$ are a plurality of IO requests obtained by the computing device in 10:00 to 10:10, and the IO requests that are of the K types and that are obtained by the computing device in S101 are IO requests that are of K types and that are obtained by the computing device in 10:11 to 11:00.

In another possible implementation, the plurality of IO requests obtained by the computing device in S101$a$ are a preset quantity of first IO requests in a time sequence in all IO requests obtained by the computing device in the first cycle. In this case, the IO requests that are of the K types and that are obtained by the computing device in S101 are IO requests other than the preset quantity of IO requests in all the IO requests obtained by the computing device in the first cycle. A specific value of the preset quantity is not limited in this embodiment of this application.

As an example, assuming that a value of the preset quantity is 1000, and all the IO requests obtained by the computing device in the first cycle include 10000 IO requests, the plurality of IO requests obtained by the computing device in S101$a$ are first 1000 IO requests in a time sequence in the 10000 IO requests, namely, the first IO request to the $1000^{th}$ IO request in the time sequence in the 10000 IO requests. In this way, the IO requests that are of the K types and that are obtained by the computing device in S101 are 9000 IO requests other than the first IO request to the $1000^{th}$ IO request in the 10000 IO requests, namely, the $1001^{st}$ IO request to the $10000^{th}$ IO request in the time sequence in the 10000 IO requests.

S101$b$: Extract features of accessing logical addresses by the plurality of IO requests.

The features of accessing the logical addresses by the plurality of IO requests include access frequencies of accessing same logical addresses by the plurality of IO requests, and/or include reuse times of the logical addresses accessed by the plurality of IO requests.

Optionally, after obtaining the plurality of IO requests, for a logical address (for example, a first logical address) accessed by any one of the plurality of IO requests, the computing device collects, in the plurality of IO requests, statistics on a quantity (for example, a first quantity) of IO requests accessing the first logical address. It may be understood that the first quantity is an access frequency of accessing the first logical address by the plurality of IO requests. Then, the computing device determines the determined first quantity as a frequency feature of each IO request accessing the first logical address in the plurality of IO requests.

Similarly, the computing device may determine a frequency feature of each of the plurality of IO requests.

Optionally, in a process of obtaining the plurality of IO requests, each time obtaining an IO request, the computing device may determine a reuse time of a logical address accessed by the IO request. Alternatively, after obtaining the plurality of IO requests, the computing device may determine a reuse time of a logical address accessed by each of the plurality of IO requests. For detailed descriptions of the reuse time, refer to the descriptions in the foregoing terms. Details are not described again.

It may be understood that, for the plurality of IO requests, at least two IO requests that access a same logical address (for example, a first logical address) may exist in the plurality of IO requests, and for the at least two IO requests, the computing device determines different reuse times of the first logical address. In other words, for one logical address, the computing device may determine a plurality of different reuse times. For example, for 10 IO requests that access logical addresses (a, b, d, c, b, d, a, a, c, d) in a time sequence, a reuse time of a logical address d accessed by the third IO request in the 10 requests is infinite, a reuse time of a logical address d accessed by the sixth IO request is 2, and a reuse time of a logical address d accessed by the tenth IO request is 3.

In this case, after determining a reuse time of a logical address accessed by each IO request, the computing device may select a reuse time from different reuse times of a same logical address, and use the selected reuse time as a reuse time feature of each IO request accessing the logical address.

Optionally, the computing device may randomly select a reuse time from different reuse times of a same logical address, and use the selected reuse time as a reuse time feature of each IO request accessing the logical address. The reuse time randomly selected by the computing device is a non-infinite reuse time. Alternatively, the computing device may calculate an average of a plurality of different determined reuse times of a same logical address (or round up/down a value obtained after the average calculation), and use the calculated average (or a rounded value obtained after the average calculation) as a reuse time feature of each IO request accessing the logical address. This is not limited in this application. The plurality of different reuse times used to calculate the average are a plurality of different reuse times other than a reuse time whose value is infinite.

As an example, for 10 IO requests that access logical addresses (a, b, d, c, b, d, a, a, c, d) in a time sequence, a reuse time of a logical address d accessed by the third IO request in the 10 requests is infinite, a reuse time of a logical address d accessed by the sixth IO request is 2, and a reuse time of a logical address d accessed by the tenth IO request is 3. Therefore, the computing device may use 2 or 3 as a reuse time feature of each IO request accessing the logical address d. Alternatively, the computing device calculates an average of the reuse time 2 of the logical address d accessed by the sixth IO request and the reuse time 3 of the logical address d accessed by the tenth IO request, rounds up the average (rounds up [(2+3)/2]), and uses a rounded value 3 obtained after the average calculation as a reuse time feature of each IO request accessing the logical address d.

S101$c$: Classify the plurality of IO requests into IO requests of K types based on the features of accessing the logical addresses by the plurality of IO requests.

Specifically, the computing device classifies the plurality of IO requests into the IO requests of the K types based on the features of accessing the logical addresses by the plurality of IO requests and at least one feature threshold. The feature threshold includes a frequency threshold and/or a reuse time threshold.

In a possible case, when the features of accessing the logical addresses by the plurality of IO requests include the access frequencies of accessing the same logical addresses by the plurality of IO requests, the computing device classifies the plurality of IO requests into the IO requests of the K types based on the frequency feature of each of the plurality of IO requests and K−1 frequency thresholds. It should be noted that there is relatively high similarity between logical addresses accessed by IO requests belonging to a same type.

Optionally, the K−1 frequency thresholds may be frequency thresholds preset by the user. Alternatively, the K−1 frequency thresholds are K−1 critical frequencies between K frequency ranges into which the computing device classifies, according to a first preset algorithm, the plurality of frequencies determined in S101*b*. The first preset algorithm may be any classification algorithm. This is not limited in this embodiment of this application. There is relatively high similarity between logical addresses accessed by IO requests whose frequency features belong to one frequency range.

In another possible case, when the features of accessing the logical addresses by the plurality of IO requests include the reuse times of the logical addresses accessed by the plurality of IO requests, the computing device classifies the plurality of IO requests into the IO requests of the K types based on a reuse time feature of each of the plurality of IO requests and K−1 reuse time thresholds. It should be noted that there is relatively high similarity between logical addresses accessed by IO requests belonging to a same type.

Optionally, the K−1 reuse time thresholds may be reuse time thresholds preset by the user. Alternatively, the K−1 reuse time thresholds are K−1 critical reuse times between K reuse time ranges into which the computing device classifies, according to a second preset algorithm, the plurality of reuse times determined in S101*b*. The second preset algorithm may be any classification algorithm. This is not limited in this embodiment of this application. There is relatively high similarity between logical addresses accessed by IO requests whose reuse time features belong to one reuse time range.

In still another possible case, when the features of accessing the logical addresses by the plurality of IO requests include the access frequencies of accessing the same logical addresses by the plurality of IO requests and include the reuse times of the logical address accessed by the plurality of IO requests, the computing device classifies the plurality of IO requests into the IO requests of the K types based on the frequency feature of each of the plurality of IO requests, p frequency thresholds, a reuse time feature of each of the plurality of IO requests, and q reuse time thresholds. Both p and q are positive integers, and p+q≤K−1. For detailed descriptions of the frequency threshold and the reuse time threshold, refer to the foregoing descriptions. Details are not described again.

Optionally, for the plurality of IO requests obtained by the computing device in S101*a*, the computing device may first classify the plurality of IO requests into q+1 types based on the reuse time feature of each of the plurality of IO requests and the q reuse time thresholds. Then, for IO requests of at least one of the q+1 types, the computing device classifies IO requests of each of the at least one type into IO requests of p+1 types based on a frequency feature of each IO request of the at least one type and the p frequency thresholds, to classify the plurality of IO requests into the IO requests of the K types. It should be noted that there is relatively high similarity between logical addresses accessed by IO requests belonging to a same type.

As an example, values of both p and q are 1, and a value of K is 3. Referring to FIG. 8, for the plurality of IO requests obtained by the computing device in S101*a*, the computing device may first classify the plurality of IO requests into IO requests of a first type and IO requests of a second type based on the reuse time feature of each of the plurality of IO requests and one reuse time threshold (for example, a threshold 1). The IO requests of the first type are IO requests whose reuse time features are less than the threshold 1, and the IO requests of the second type are IO requests whose reuse time features are greater than the threshold 1. A case in which a reuse time feature is equal to the threshold 1 is not limited in this embodiment of this application. For example, an IO request whose reuse time feature is equal to the threshold 1 may be an IO request of the first type or an IO request of the second type.

Then, for IO requests of any type in the IO requests of the first type or the IO requests of the second type, for example, the IO requests of the second type, the computing device classifies the IO requests of the second type into IO requests of a third type and IO requests of a fourth type based on a frequency feature of each of the IO requests of the second type and one frequency threshold (for example, a threshold 2). The IO requests of the third type are IO requests whose frequency features are less than the threshold 2, and the IO requests of the fourth type are IO requests whose frequency features are greater than the threshold 2. A case in which a frequency feature is equal to the threshold 2 is not limited in this embodiment of this application. For example, an IO request whose frequency feature is equal to the threshold 2 may be an IO request of the third type or an IO request of the fourth type.

In this way, the plurality of IO requests obtained by the computing device in S101*a* are classified into the IO requests of the first type, the IO requests of the third type, and the IO requests of the fourth type.

Optionally, for the plurality of IO requests obtained by the computing device in S101*a*, the computing device may first classify the plurality of IO requests into p+1 types based on the frequency feature of each of the plurality of IO requests and the p frequency thresholds. Then, for IO requests of at least one of the p+1 types, the computing device classifies IO requests of each of the at least one type into q+1 types based on the reuse time feature of each of the plurality of IO requests and the q reuse time thresholds, to classify the plurality of IO requests into the IO requests of the K types. It should be noted that there is relatively high similarity between logical addresses accessed by IO requests belonging to a same type.

S101*d*: Generate a classifier based on the plurality of IO requests classified into the K types.

After classifying the obtained plurality of IO requests into the IO requests of the K types, the computing device tags a type identifier for each IO request, where the type identifier is used to indicate a type to which the IO request belongs.

For example, the computing device classifies the obtained plurality of IO requests into IO requests of two types (including IO requests of a type 1 and IO requests of a type 2). In this way, the computing device tags, for each IO request of the type 1, an identifier 1 indicating the type 1, and tags, for each IO request of the type 2, an identifier 2 indicating the type 2.

Then, the computing device generates the classifier based on a sample parameter of each of the plurality of IO requests and a third preset algorithm. A sample parameter of an IO request includes a type identifier of the IO request and a logical address carried in the IO request. The third preset algorithm may be any classification algorithm with supervised learning. This is not limited in this embodiment of this application.

Optionally, the third preset algorithm may be a k-nearest-neighbor (k-Nearest-Neighbor, KNN) algorithm or a KNN+ prototype algorithm. The KNN+prototype algorithm is simpler than the KNN algorithm. Then, the computing device may input the sample parameter of each of the plurality of IO requests into KNN (or KNN+prototype), to obtain the classifier. In this way, when receiving a logical address of a to-be-classified IO request, the classifier may first determine a sample parameter including a logical address most similar to the logical address, and output a type identifier in the sample parameter, to indicate a type of the to-be-classified IO request.

For example, in S101, the computing device may input a logical address 1 of an obtained IO request 1 into the generated classifier. In this way, the classifier determines that a logical address most similar to the logical address 1 is a logical address 2. Then, the classifier outputs a type identifier 1 in a sample parameter 1 including the logical address 2, to indicate a type of the IO request 1.

In this way, based on the method in S101a to S101d, the computing device may generate the classifier used to classify the IO requests. When the method in S101 to S104 is cyclically performed, a classifier generated by the computing device based on one part of IO requests in a current cycle may be configured to classify the other part of the IO requests in the current cycle (for example, into K types), to determine a partition size and an eviction algorithm of IO requests of each type in the shared cache based on access characteristics of accessing the shared cache by the classified IO requests of the K types.

In addition, the classifier generated by the computing device in the current cycle may be configured to classify IO requests initiated by entities in a next cycle of the current cycle, so that the classified IO requests access a cache corresponding to the classified IO requests. Therefore, based on the method in S101a to S101d, an entity initiating an IO request does not need to tag, for the IO request, a type tag used for classification, so that the entity initiating the IO request does not generate additional resource overheads. In addition, because the method provided in this embodiment of this application does not intrude into an upper layer (the entities that initiate the IO requests) of the cache, the method provided in this embodiment of this application can be applied to a universal cache system oriented to diversified customers, without ecological support.

Embodiment 2

The method for managing a shared cache provided in embodiments of this application may be further applied to a scenario in which a read cache and a write cache in the shared cache are fused. That the read cache and the write cache in the shared cache are fused means that the read cache and the write cache are not distinguished in the shared cache, and an IO request used to read data and an IO request used to write data share the shared cache.

In a scenario in which a read cache and a write cache in a shared cache are fused, FIG. 9 is a schematic flowchart of another method for managing a shared cache according to an embodiment of this application. Optionally, the method may be applied to the CPU shown in FIG. 1, may be applied to the cache node shown in FIG. 2, or may be applied to the node shown in FIG. 3. The method may be performed by a computing device having the hardware structure shown in FIG. 4, and the method includes the following steps.

S201: Obtain IO requests initiated by a plurality of entities, and determine a type of each IO request, where the IO requests initiated by the plurality of entities include IO requests of K types, and IO requests of each of the K types include IO read requests and IO write requests.

For detailed descriptions of obtaining, by the computing device, the IO requests initiated by the plurality of entities, and determining the type of each IO request, refer to the descriptions of S101. Details are not described again.

It should be noted that in S101, the IO request obtained by the computing device is one of an IO read request used to read data or an IO write request used to write data. However, in S201, the IO request obtained by the computing device includes an IO read request used to read data and an IO write request used to write data.

S202: Determine a read access characteristic of accessing the shared cache by IO read requests of each of the K types, and determine a write access characteristic of accessing the shared cache by IO write requests of each of the K types.

The read access characteristic is respective relationships between read hit rates and cache sizes of the IO read requests of each of the K types in N eviction algorithms, and the write access characteristic is respective relationships between write hit rates and cache sizes of the IO write requests of each of the K types using the N eviction algorithms. Herein, the read hit rate is a read hit rate of the IO read requests in the cache. The write hit rate is a write hit rate of the IO write requests in the cache.

Specifically, the computing device determines, based on the obtained IO read requests of each of the K types, the read access characteristic of accessing the shared cache by the IO read requests of each of the K types; and the computing device determines, based on the obtained IO write requests of each of the K types, the write access characteristic of accessing the shared cache by the IO write requests of each of the K types.

For detailed descriptions of determining, by the computing device based on the IO read requests of each of the K types, the read access characteristic of accessing the shared cache by the IO read requests of each of the K types, and detailed descriptions of determining, based on the IO write requests of each of the K types, the write access characteristic of accessing the shared cache by the IO write requests of each of the K types, refer to the related descriptions of "determining, by the computing device based on the obtained IO requests of each of the K types, the access characteristic of accessing the shared cache by the IO requests of each of the K types" in S102. Details are not described.

S203: Determine a partition size and an eviction algorithm of the IO requests of each type in the shared cache based on the read access characteristic of the IO read requests of each of the K types, the write access characteristic of the IO write requests of each of the K types, and a hit rate of the shared cache.

Specifically, for detailed descriptions of determining, by the computing device, the partition size and the eviction algorithm of the IO requests of each type in the shared cache based on the read access characteristic of the IO read requests of each of the K types, the write access characteristic of the IO write requests of each of the K types, and the hit rate of the shared cache, refer to the descriptions of S103.

It should be noted that, for "the computing device may obtain one hit rate of the IO requests of the K types in the shared cache based on a hit rate of the IO requests of each type in any combination" in S103, in S203, the computing device may obtain a comprehensive hit rate of the IO requests of the K types in the shared cache based on a read hit rate of the IO read requests of each type in any combination, a read hit weight coefficient, a write hit rate of the IO write requests of each type in any combination, and a write hit weight coefficient.

The read hit weight coefficient is used to represent a degree of impact of the read hit rate of the IO read requests of each type in the shared cache on the comprehensive hit rate of the shared cache, and the write hit weight coefficient is used to represent a degree of impact of the write hit rate of the IO write requests of each type in the shared cache on the comprehensive hit rate of the shared cache. The comprehensive hit rate of the shared cache is a hit rate of the IO requests of the K types in the shared cache. Specific values of the read hit weight coefficient and the write hit weight coefficient are not limited in this embodiment of this application. For example, both the read hit weight coefficient and the write hit weight coefficient are preset weight coefficients. For another example, the read hit weight coefficient and/or the write hit weight coefficient may be determined based on a rule of accessing the shared cache by entities in a recent period of time, or the read hit weight coefficient and/or write hit weight coefficient may be determined based on an estimated rule of accessing the shared cache by entities in a future period of time.

Specifically, for IO requests of any one of the K types (for example, IO requests of a first type), the computing device may determine, based on a hit rate of IO read requests (IO read requests of the first type) in the IO requests of the first type in any combination (for example, a first combination) and a proportion of the IO read requests of the first type in the IO requests of the K types, a hit rate of the IO read requests of the first type in the shared cache in the first combination. For example, the computing device performs a product operation on the hit rate of the IO read requests of the first type in the first combination and the proportion of the IO read requests of the first type in the IO requests of the K types, to obtain the hit rate of the IO read requests of the first type in the shared cache in the first combination.

Similarly, for IO write requests (referred to as IO write requests of the first type below) in the IO requests of the first type, the computing device may determine, based on a hit rate of the IO write requests of the first type in any combination (for example, the first combination) and a proportion of the IO write requests of the first type in the IO requests of the K types, a hit rate of the IO write requests of the first type in the shared cache in the first combination. For example, the computing device performs a product operation on the hit rate of the IO write requests of the first type in the first combination and the proportion of the IO write requests of the first type in the IO requests of the K types, to obtain the hit rate of the IO write requests of the first type in the shared cache in the first combination.

For detailed descriptions of the proportion of the IO read requests of the first type in the IO requests of the K types and the proportion of the IO write requests of the first type in the IO requests of the K types, refer to the related descriptions of S103. Details are not described.

Then, the computing device determines a hit rate of the IO requests of the first type in the shared cache in the first combination based on the hit rate (for example, a first hit rate) of the IO read requests of the first type in the shared cache in the first combination, the read hit weight coefficient, the hit rate (for example, a second hit rate) of the IO write requests of the first type in the shared cache in the first combination, and the write hit weight coefficient. For example, the computing device performs a summation operation on a product of the first hit rate and the read hit weight coefficient and a product of the second hit rate and the write hit weight coefficient, to obtain the hit rate of the IO requests of the first type in the shared cache in the first combination. As an example, assuming that the read hit weight coefficient is W1, and the write hit weight coefficient is W2, the hit rate of the IO requests of the first type in the shared cache in the first combination is first hit rate×W1+ second hit rate×W2.

Similarly, the computing device may determine a hit rate of the IO requests of each type in the shared cache in any combination. Then, the computing device performs summation on K respective hit rates of the IO requests of the K types in the shared cache, to obtain the hit rate of the IO requests of the K types in the shared cache. Further, for the IO requests of the K types, the computing device may obtain (X×N) K hit rates of the IO requests of the K types in the shared cache based on X×N hit rates of the IO requests of each type in X×N combinations. Further, the computing device determines a maximum hit rate of the IO requests of the K types in the shared cache; and determines, as the partition size of the IO requests of each type in the shared cache, a cache size indicated by a combination corresponding to each type when the maximum hit rate is obtained, and determines, as the eviction algorithm of the IO requests of each type in the shared cache, an eviction algorithm indicated by the combination corresponding to each type when the maximum hit rate is obtained. For detailed descriptions, refer to the descriptions of S103. Details are not described.

It should be noted that when the computing device performs summation on the K respective hit rates of the IO requests of the K types in the shared cache, to obtain the hit rate of the IO requests of the K types in the shared cache, a sum of cache sizes of the IO requests of the K types is less than or equal to a size of the shared cache.

Then, the computing device performs S104.

In this way, according to the method for managing a shared cache in S201 to S104, in a scenario in which a read cache and a write cache in the shared cache are fused, an appropriate cache size and eviction algorithm can be determined and configured for the IO requests of each type, so that a hit rate of the IO requests in the shared cache can be improved, thereby improving overall cache performance of the shared cache.

In some embodiments, the method in S201 to S104 may be cyclically performed. For related descriptions, refer to the related descriptions in Embodiment 1. Details are not described. Through cyclical execution of S201 to S104, the shared cache may cyclically adjust a cache size and an eviction algorithm of the IO requests of each type in the shared cache based on a cache size and an eviction algorithm that are of the IO requests of each of the K types and that are cyclically determined by the computing device, to ensure a hit rate of the IO requests in the shared cache in time domain, in other words, ensure cache performance of the shared cache in time domain.

Embodiment 3

In a scenario in which a read cache and a write cache in a shared cache are fused, FIG. 10 is a schematic flowchart of still another method for managing a shared cache according to an embodiment of this application. Optionally, the method may be applied to the CPU shown in FIG. 1, may be applied to the cache node shown in FIG. 2, or may be applied to the node shown in FIG. 3. The method may be performed by a computing device having the hardware structure shown in FIG. 4. The computing device first performs S201, and then the computing device performs S302.

S302: Determine, based on the IO read requests of each of the K types, a read hit weight coefficient, the IO write requests of each of the K types, and a write hit weight coefficient, an access characteristic of accessing the shared cache by the IO requests of each of the K types.

For detailed descriptions of the read hit weight coefficient and the write hit weight coefficient, refer to the foregoing descriptions. Details are not described again.

Specifically, the computing device first determines, based on the obtained IO read requests of each of the K types, read hit rates of the IO read requests of each type in caches of different sizes in N eviction algorithms, and the computing device determines, based on the obtained IO write requests of each of the K types, write hit rates of the IO write requests of each type in caches of different sizes in the N eviction algorithms. For example, for IO requests of a first type in the IO requests of the K types, the computing device may determine, based on obtained IO read requests of the first type, read hit rates of the IO read requests of the first type in the caches of the different sizes in the N eviction algorithms; and the computing device may determine, based on obtained IO write requests of the first type, write hit rates of the IO write requests of the first type in the caches of the different sizes in the N eviction algorithms.

For descriptions of the IO read request, the read hit rate, the IO write request, the write hit rate, the IO read request of the first type, and the IO write request of the first type, refer to the foregoing related descriptions. Details are not described again.

For detailed descriptions of determining, by the computing device based on the obtained IO read requests of each of the K types, the read hit rates of the IO read requests of each type in the caches of the different sizes in the N eviction algorithms, and detailed descriptions of determining, by the computing device based on the obtained IO write requests of each of the K types, write hit rates of the IO write requests of each type in the caches of the different sizes in the N eviction algorithms, refer to the related descriptions of determining the hit rates of the IO requests of each type in the caches of the different sizes in the N eviction algorithms in S102. Details are not described.

Then, for the IO requests of the first type in the IO requests of the K types, in a same eviction algorithm and a same cache size, the computing device performs a summation operation on a product of a read hit rate of the IO read requests of the first type and the read hit weight coefficient and a product of a write hit rate of the IO write requests of the first type and the write hit weight coefficient, to obtain a hit rate of the IO requests of the first type in the eviction algorithm and the cache size.

Similarly, the computing device may determine hit rates of the IO requests of each type in the caches of the different sizes in the N eviction algorithms. In this way, respective relationships between the hit rates and the cache sizes of the IO requests of each of the K types using the N eviction algorithms are obtained, in other words, the access characteristic of accessing the shared cache by the IO requests of each of the K types is obtained.

Then, the computing device performs S103 and S104.

In this way, according to the method for managing a shared cache in FIG. 10, in a scenario in which a read cache and a write cache in the shared cache are fused, an appropriate cache size and eviction algorithm can be determined and configured for the IO requests of each type, so that a hit rate of the IO requests in the shared cache can be improved, thereby improving overall cache performance of the shared cache.

In some embodiments, the method in FIG. 10 may be cyclically performed. For related descriptions, refer to the related descriptions in Embodiment 1. Details are not described. Through cyclical execution of the method in FIG. 10, the shared cache may cyclically adjust a cache size and an eviction algorithm of the IO requests of each type in the shared cache based on a cache size and an eviction algorithm that are of the IO requests of each of the K types and that are cyclically determined by the computing device, to ensure a hit rate of the IO requests in the shared cache in time domain, in other words, ensure cache performance of the shared cache in time domain.

The foregoing mainly describes the solutions provided in embodiments of this application from a perspective of the method.

To implement the foregoing function, FIG. 11 is a schematic diagram of a structure of an apparatus 110 for managing a shared memory according to an embodiment of this application. The management apparatus 110 is configured to perform the foregoing method for managing a shared cache, for example, configured to perform the method shown in FIG. 5, FIG. 7, FIG. 9, or FIG. 10. The management apparatus 110 may include a determining unit 111 and a configuration unit 112.

The determining unit 111 is configured to determine an access characteristic of accessing the shared cache by IO requests of each of K types; and configured to determine a partition size and an eviction algorithm of the IO requests of each type in the shared cache based on access characteristics of IO requests of the K types and a hit rate of the shared cache. The access characteristic is respective relationships between hit rates and cache sizes of the IO requests of each of the K types in N eviction algorithms. The configuration unit 112 is configured to: configure a cache size of the IO requests of each type in the shared cache as the determined partition size of the IO requests of each type in the shared cache, and configure an eviction algorithm of the IO requests of each type in the shared cache as the determined eviction algorithm of the IO requests of each type in the shared cache.

As an example, with reference to FIG. 5, the determining unit 111 may be configured to perform S102 and S103, and the configuration unit 112 may be configured to perform S104. With reference to FIG. 9, the determining unit 111 may be configured to perform S202 and S203, and the configuration unit 112 may be configured to perform S104. With reference to FIG. 10, the determining unit 111 may be configured to perform S302 and S103, and the configuration unit 112 may be configured to perform S104.

Optionally, the management apparatus 110 further includes: a simulation unit 113, configured to: for a first eviction algorithm in the N eviction algorithms, simulate, in the shared cache, hit rates of applying the first eviction algorithm to caches of different sizes for the IO requests of each of the K types, to obtain relationships between the hit rates and the cache sizes The first eviction algorithm is any one of the N eviction algorithms.

Optionally, the determining unit 111 is specifically configured to: for a first eviction algorithm in the N eviction algorithms, determine, based on a reuse distance of each of IO requests of a first type and different cache sizes, hit rates of applying the first eviction algorithm to caches of different sizes for the IO requests of the first type, to obtain relationships between the hit rates and the cache sizes. The first eviction algorithm is any one of the N eviction algorithms, and the IO requests of the first type are IO requests of any one of the K types.

Optionally, the determining unit 111 is further specifically configured to: determine hit rates of the IO requests of the K types in the shared cache in each combination based on X hit rates that correspond to X cache sizes and that are determined based on the IO requests of each type in each eviction algorithm; and determine, as the partition size of the IO requests of each type in the shared cache, a cache size that corresponds to the IO requests of each type when a hit rate of the IO requests of the K types in the shared cache is largest, and determine, as the eviction algorithm of the IO requests of each type in the shared cache, an eviction algorithm that corresponds to the IO requests of each type when the hit rate of the IO requests of the K types in the shared cache is largest. For any type in the IO requests of the K types, the X cache sizes and the N eviction algorithms constitute X*N combinations, each combination includes one cache size and one eviction algorithm, and the X cache sizes are X cache sizes preset for a cache corresponding to the IO requests of each type.

As an example, with reference to FIG. 5, the determining unit 111 may be configured to perform S103. With reference to FIG. 9, the determining unit 111 may be configured to perform S203.

Optionally, the management apparatus 110 further includes: an obtaining unit 114, configured to obtain the plurality of IO requests before the access characteristic of accessing the shared cache by the IO requests of each of the K types is determined; and a classification unit 115, configured to classify the IO requests into the K types based on features of addresses of data accessed by the plurality of IO requests or based on type tags carried in the plurality of IO requests.

As an example, with reference to FIG. 5, the obtaining unit 114 and the classification unit 115 may be configured to perform S101.

Optionally, if the shared cache is an LLC of a CPU in a computing device, the plurality of IO requests are IO requests initiated by a plurality of processing cores in the CPU.

Optionally, if the shared cache is a cache in a cache node, the plurality of IO requests are IO requests initiated by a plurality of computing nodes that access the cache node.

Optionally, if the shared cache is a cache pool including caches in a plurality of nodes, the plurality of IO requests are IO requests initiated by a plurality of computing nodes that access the cache pool.

Optionally, the access characteristic is represented by an HRC or an MRC of the IO requests.

Optionally, the determining unit 111 is further configured to cyclically determine an access characteristic of accessing the shared cache by the IO requests of each of the K types. For an access characteristic that is of accessing the shared cache by the IO requests of each of the K types and that is determined in a first cycle, the determining unit 111 is specifically configured to determine, in the first cycle, a partition size and an eviction algorithm of the IO requests of each type in the shared cache based on access characteristics that are of the IO requests of the K types and that are determined in the first cycle and the hit rate of the shared cache, where the first cycle is any cycle for determining the access characteristic of accessing the shared cache by the IO requests of each of the K types.

For specific descriptions of the foregoing optional manners, refer to the foregoing method embodiments. Details are not described herein again. In addition, for descriptions of any one of the foregoing provided explanations and beneficial effects of the management apparatus 110, refer to the foregoing corresponding method embodiments. Details are not described again.

As an example, with reference to FIG. 4, functions implemented by the determining unit 111, the configuration unit 112, the simulation unit 113, and the classification unit 115 in the management apparatus 110 may be implemented by the processor 401 in FIG. 4 by executing program code in the memory 402 in FIG. 4. A function implemented by the obtaining unit 114 may be implemented by the communications interface 403 in FIG. 4.

A person skilled in the art should be easily aware that, in combination with units and algorithm steps of the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

It should be noted that module division in FIG. 11 is an example, and is merely logical function division. During actual implementation, another division manner may be used. For example, two or more functions may be integrated into one processing module. The integrated module may be implemented in a form of hardware, or may be implemented in a form of a software functional module.

An embodiment of this application further provides a computer program product and a computer-readable storage medium configured to store the computer program product. The computer program product may include one or more program instructions. When the one or more program instructions are run by one or more processors, the functions described for FIG. 5, FIG. 7, FIG. 9, or FIG. 10 or some of the functions may be provided. Therefore, for example, one or more features of S101 to S104 in FIG. 5 may be implemented by one or more instructions in the computer program product.

In some examples, the apparatus for managing a shared cache for performing the method in FIG. 5, FIG. 7, FIG. 9, or FIG. 10 may be configured to provide various operations, functions, or actions in response to one or more program instructions stored in the computer-readable storage medium.

An embodiment of this application further provides a computing device. The computing device may be configured to perform the method in FIG. 5, FIG. 7, FIG. 9, or FIG. 10, to manage a shared cache.

Optionally, the computing device may be a same device as a device including the shared cache, or the computing device may be a device that is connected to and communicates with the device including the shared cache. For detailed descriptions, refer to the related descriptions of the computing device in FIG. 4. Details are not described again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer-executable instructions are executed on a computer, all or some of the procedures or functions according to embodiments of this application are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

The foregoing descriptions are merely specific implementations of the present invention, but the protection scope of the present invention is not limited thereto. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A method for managing a shared cache, wherein the shared cache is configured to cache data that a plurality of input/output (IO) requests request to operate, the plurality of IO requests correspond to K types of IO requests, the shared cache corresponds to N eviction algorithms, and K and N are integers greater than 1, and wherein the method comprises:

for each type of the K types, determining an access characteristic of accessing the shared cache by IO requests of the each type to obtain K access characteristics, wherein each access characteristic of the K access characteristics includes N relationships between hit rates and cache sizes of IO requests of a corresponding type of the K types, and each relationship of the N relationships is determined using a respective eviction algorithm of the N eviction algorithms;

for each type of the K types, determining a partition size and an eviction algorithm of the IO requests of the each type in the shared cache based on the K access characteristics and a hit rate of the shared cache, wherein the determined eviction algorithm is one of the N eviction algorithms; and for each type of the K types, configuring a cache size of the IO requests of the each type in the shared cache as the determined partition size of the IO requests of the each type in the shared cache, and configuring an eviction algorithm of the IO requests of the each type in the shared cache as the determined eviction algorithm of the IO requests of the each type in the shared cache.

2. The method according to claim 1, wherein determining the access characteristic of accessing the shared cache by the IO requests of the each type comprises:

for a first eviction algorithm in the N eviction algorithms, simulating, in the shared cache, hit rates of applying the first eviction algorithm to caches of different sizes for the IO requests of the each type to obtain a corresponding relationship between the hit rates and the cache sizes, wherein the first eviction algorithm is any one of the N eviction algorithms.

3. The method according to claim 1, wherein determining the access characteristic of accessing the shared cache by the IO requests of the each type comprises:

for a first eviction algorithm in the N eviction algorithms, determining, based on a reuse distance of each of IO requests of a first type and different cache sizes, hit rates of applying the first eviction algorithm to caches of different sizes for the IO requests of the first type to obtain a corresponding relationship between the hit rates and the cache sizes, wherein the first eviction algorithm is any one of the N eviction algorithms, and the IO requests of the first type are IO requests of any one of the K types.

4. The method according to claim 1, wherein determining the partition size and the eviction algorithm of the IO requests of the each type in the shared cache based on the K access characteristics and the hit rate of the shared cache comprises:

determining hit rates of the IO requests of the K types in the shared cache in each combination based on X hit rates that correspond to X cache sizes and that are determined based on the IO requests of each type in each eviction algorithm, wherein for IO requests of any type of the K types, the X cache sizes and the N eviction algorithms constitute X*N combinations, each combination comprises one cache size and one eviction algorithm, and the X cache sizes are X cache sizes preset for a cache corresponding to the IO requests of each type; and determining, as the partition size of the IO requests of the each type in the shared cache, a cache size that corresponds to the IO requests of the each type when a hit rate of the IO requests of the K types in the shared cache is largest, and determining, as the eviction algorithm of the IO requests of the each type in the shared cache, an eviction algorithm that corresponds to the IO requests of the each type when the hit rate of the IO requests of the K types in the shared cache is largest.

5. The method according to claim 1, wherein before determining the access characteristic of accessing the shared cache by the IO requests of the each type, the method further comprises:

obtaining the plurality of IO requests; and classifying the IO requests into the K types based on features of addresses of data accessed by the plurality of IO requests or based on type tags carried in the plurality of IO requests.

6. The method according to claim 1, wherein:

the shared cache is a level-3 cache (LLC) of a central processing unit (CPU) in a computing device, and the plurality of IO requests are IO requests initiated by a plurality of processing cores in the CPU; or the shared cache is a cache in a cache node, and the plurality of IO requests are IO requests initiated by a plurality of computing nodes that access the cache node; or the shared cache is a cache pool comprising caches in a plurality of nodes, and the plurality of IO requests are IO requests initiated by a plurality of computing nodes that access the cache pool.

7. The method according to claim 1, wherein the access characteristic is represented by a hit rate curve (HRC) or a miss rate curve (MC) of the IO requests.

8. The method according to claim 1, wherein determining the access characteristic of accessing the shared cache by the IO requests of the each type comprises:

cyclically determining the access characteristic of accessing the shared cache by the IO requests of the each type; and wherein for the K access characteristics determined in a first cycle, determining the partition size and the eviction algorithm of the IO requests of the each type in the shared cache based on the K access characteristics and the hit rate of the shared cache comprises:

determining, in the first cycle, the partition size and the eviction algorithm of the IO requests of the each type in the shared cache based on the K access characteristics determined in the first cycle and the hit rate of the shared cache, wherein the first cycle is any cycle for cyclically determining the access characteristic of accessing the shared cache by the IO requests of the each type.

9. An apparatus for managing a shared cache, wherein the shared cache is configured to cache data that a plurality of input/output (IO) requests request to operate, the plurality of IO requests correspond to K types of IO requests, the shared cache corresponds to N eviction algorithms, and K and N are integers greater than 1, and wherein the apparatus comprises:

at least one processor; and at least one memory coupled to the at least one processor and storing programming instructions for execution by the at least one processor to:

for each type of the K types, determine an access characteristic of accessing the shared cache by IO requests of the each type to obtain K access characteristics, wherein each access characteristic of the K access characteristics includes N relationships between hit rates and cache sizes of IO requests of a corresponding type of the K types, and each relationship of the N relationships is determined using a respective eviction algorithm of the N eviction algorithms;

for each type of the K types, determine a partition size and an eviction algorithm of the IO requests of the each type in the shared cache based on the K access characteristics and a hit rate of the shared cache, wherein the determined eviction algorithm is one of the N eviction algorithms; and for each type of the K types, configure a cache size of the IO requests of the each type in the shared cache as the determined partition size of the IO requests of the each type in the shared cache, and configure an eviction algorithm of the IO requests of the each type in the shared cache as the determined eviction algorithm of the IO requests of the each type in the shared cache.

10. The apparatus according to claim 9, wherein the programming instructions are for execution by the at least one processor to:

for a first eviction algorithm in the N eviction algorithms, simulate, in the shared cache, hit rates of applying the first eviction algorithm to caches of different sizes for the IO requests of the each type to obtain a corresponding relationship between the hit rates and the cache sizes, wherein the first eviction algorithm is any one of the N eviction algorithms.

11. The apparatus according to claim 9, wherein the programming instructions are for execution by the at least one processor to:

for a first eviction algorithm in the N eviction algorithms, determine, based on a reuse distance of each of IO requests of a first type and different cache sizes, hit rates of applying the first eviction algorithm to caches of different sizes for the IO requests of the first type to obtain a corresponding relationship between the hit rates and the cache sizes, wherein the first eviction algorithm is any one of the N eviction algorithms, and the IO requests of the first type are IO requests of any one of the K types.

12. The apparatus according to claim 9, wherein the programming instructions are for execution by the at least one processor to:

determine hit rates of the IO requests of the K types in the shared cache in each combination based on X hit rates that correspond to X cache sizes and that are determined based on the IO requests of each type in each eviction algorithm, wherein for IO requests of any type of the K types, the X cache sizes and the N eviction algorithms constitute X*N combinations, each combination comprises one cache size and one eviction algorithm, and the X cache sizes are X cache sizes preset for a cache corresponding to the IO requests of each type; and determine, as the partition size of the IO requests of the each type in the shared cache, a cache size that corresponds to the IO requests of the each type when a hit rate of the IO requests of the K types in the shared cache is largest, and determine, as the eviction algorithm of the IO requests of each type in the shared cache, an eviction algorithm that corresponds to the IO requests of each type when the hit rate of the IO requests of the K types in the shared cache is largest.

13. The apparatus according to claim 9, wherein the programming instructions are for execution by the at least one processor to:

obtain the plurality of IO requests before the access characteristic of accessing the shared cache by the IO requests of the each type is determined; and classify the IO requests into the K types based on features of addresses of data accessed by the plurality of IO requests or based on type tags carried in the plurality of IO requests.

14. The apparatus according to claim 9, wherein the shared cache is a level-3 cache (LLC) of a central processing unit (CPU) in a computing device, and the plurality of IO requests are IO requests initiated by a plurality of processing cores in the CPU.

15. The apparatus according to claim 9, wherein the shared cache is a cache in a cache node, and the plurality of IO requests are IO requests initiated by a plurality of computing nodes that access the cache node.

16. The apparatus according to claim 9, wherein the shared cache is a cache pool comprising caches in a plurality of nodes, and the plurality of IO requests are IO requests initiated by a plurality of computing nodes that access the cache pool.

17. The apparatus according to claim 9, wherein the access characteristic is represented by a hit rate curve (HRC) or a miss rate curve (MRC) of the IO requests.

18. The apparatus according to claim 9, wherein the programming instructions are for execution by the at least one processor to:

cyclically determine the access characteristic of accessing the shared cache by the IO requests of the each type; and for the K access characteristics determined in a first cycle, determine, in the first cycle, the partition size and the eviction algorithm of the IO requests of the each type in the shared cache based on the K access characteristics determined in the first cycle and the hit rate of the shared cache, wherein the first cycle is any cycle for cyclically determining the access characteristic of accessing the shared cache by the IO requests of the each type.

19. A non-transitory computer-readable storage medium, wherein non-transitory the computer-readable storage medium comprises program instructions, and when the program instructions are run on a computer or a processor, the computer or the processor is enabled to perform operations comprising:

for each type of K types of input/output (IO) requests, determining an access characteristic of accessing a shared cache by IO requests of the each type to obtain K access characteristics, wherein each access characteristic of the K access characteristics includes N relationships between hit rates and cache sizes of IO requests of a corresponding type of the K types, each relationship of the N relationships is determined using a respective eviction algorithm of N eviction algorithms, and K and N are integers greater than 1;

for each type of the K types, determining a partition size and an eviction algorithm of the IO requests of the each type in the shared cache based on the K access characteristics and a hit rate of the shared cache, wherein the determined eviction algorithm is one of the N eviction algorithms; and for each type of the K types, configuring a cache size of the IO requests of the each type in the shared cache as the determined partition size of the IO requests of the each type in the shared cache, and configuring an eviction algorithm of the IO requests of the each type in the shared cache as the determined eviction algorithm of the IO requests of the each type in the shared cache.

20. The non-transitory computer-readable storage medium according to claim 19, wherein the access characteristic is represented by a hit rate curve (HRC) or a miss rate curve (MRC) of the IO requests.

\* \* \* \* \*